(12) United States Patent
Weisberg

(10) Patent No.: US 10,578,247 B2
(45) Date of Patent: Mar. 3, 2020

(54) FLUID CONTAINER

(75) Inventor: Andrew Harlan Weisberg, San Francisco, CA (US)

(73) Assignee: H2Safe, LLC, Los Angeles, CA (US)

( * ) Notice: Subject to any disclaimer, the term of this patent is extended or adjusted under 35 U.S.C. 154(b) by 269 days.

(21) Appl. No.: 13/172,386

(22) Filed: Jun. 29, 2011

(65) Prior Publication Data

US 2011/0315690 A1 Dec. 29, 2011

Related U.S. Application Data

(60) Provisional application No. 61/359,502, filed on Jun. 29, 2010.

(51) Int. Cl.
*F17C 1/00* (2006.01)
*B32B 1/08* (2006.01)
(Continued)

(52) U.S. Cl.
CPC .............. *F17C 1/00* (2013.01); *B32B 1/02* (2013.01); *B32B 1/08* (2013.01); *B32B 3/12* (2013.01); *B32B 3/266* (2013.01); *B32B 3/28* (2013.01); *B32B 15/04* (2013.01); *B32B 27/283* (2013.01); *B60K 15/03006* (2013.01); *F16L 9/19* (2013.01); *F17C 13/084* (2013.01); *F41H 5/007* (2013.01); *B32B 2250/42* (2013.01);
(Continued)

(58) Field of Classification Search
CPC ...... F17C 2201/0109; F17C 2203/0636; F17C 2260/011; F17C 1/04; F17C 1/06; F17C 1/08; F17C 13/12; F17C 2260/04; B64D 37/06; B64D 2700/6235; B65D 90/501; B65D 90/24; B65D 90/022; B65D 2700/6235; B60K 15/03177

USPC .............. 130/140; 220/4.12, 4.14, 4.26, 501, 220/506.1, 560.02, 560.03, 563, 564, 220/567.2, 585, 586, 587, 88.1, 901; 428/116, 304.4, 911–912
See application file for complete search history.

(56) References Cited

U.S. PATENT DOCUMENTS 1,436,985 A * 11/1922 Friant ........................... 220/562
3,246,789 A * 4/1966 Prögler .................... 220/560.12
(Continued)

FOREIGN PATENT DOCUMENTS

| JP | H6-143424 A | 5/1994 |
| JP | H7-329181 A | 12/1995 |
| JP | 2001-056089 A | 2/2001 |

OTHER PUBLICATIONS

ISR and Written Opinion for related PCT Application No. PCT/US2011/042439, dated Dec. 6, 2011.
(Continued)

*Primary Examiner* — Ernesto A Grano
(74) *Attorney, Agent, or Firm* — Barcelo, Harrison & Walker LLP

(57) ABSTRACT

A container that provides for control of fluid flow in the event of a failure of the container is disclosed. In accordance with embodiments of the present invention, a container is presented that includes a container wall; and one or more flow impeding structures coupled to the container wall, wherein at least one of the one or more flow impeding structures is a multi-sheet layer that deforms to impede flow in a failure of the container wall. In some embodiments, the multi-sheet layer includes cavities formed between individual sheets.

24 Claims, 28 Drawing Sheets

(51) Int. Cl.
| | |
|---|---|
| *B60K 15/03* | (2006.01) |
| *F16L 9/19* | (2006.01) |
| *B32B 1/02* | (2006.01) |
| *F41H 5/007* | (2006.01) |
| *B32B 3/28* | (2006.01) |
| *B32B 3/26* | (2006.01) |
| *F17C 13/08* | (2006.01) |
| *B32B 27/28* | (2006.01) |
| *B32B 3/12* | (2006.01) |
| *B32B 15/04* | (2006.01) |

(52) U.S. Cl.
CPC . *B32B 2307/581* (2013.01); *B32B 2307/5825* (2013.01); *B32B 2439/40* (2013.01); *B32B 2571/00* (2013.01); *B60K 2015/03039* (2013.01); *B60K 2015/03046* (2013.01); *B60K 2015/03315* (2013.01); *B60K 2015/03375* (2013.01); *B60K 2015/03381* (2013.01); *F17C 2201/0109* (2013.01); *F17C 2203/0604* (2013.01); *F17C 2203/0607* (2013.01); *F17C 2203/0619* (2013.01); *F17C 2203/0629* (2013.01); *F17C 2203/0636* (2013.01); *F17C 2205/0103* (2013.01); *F17C 2205/0111* (2013.01); *F17C 2205/0305* (2013.01); *F17C 2205/0361* (2013.01); *F17C 2209/2181* (2013.01); *F17C 2209/221* (2013.01); *F17C 2209/227* (2013.01); *F17C 2221/012* (2013.01); *F17C 2221/033* (2013.01); *F17C 2223/0123* (2013.01); *F17C 2223/0153* (2013.01); *F17C 2223/033* (2013.01); *F17C 2223/041* (2013.01); *F17C 2260/011* (2013.01); *F17C 2260/016* (2013.01); *F17C 2260/023* (2013.01); *F17C 2260/033* (2013.01); *F17C 2260/042* (2013.01); *F17C 2270/0105* (2013.01); *F17C 2270/0168* (2013.01); *F17C 2270/0197* (2013.01); *Y02E 60/321* (2013.01); *Y10T 428/24149* (2015.01); *Y10T 428/249953* (2015.04)

(56) References Cited

U.S. PATENT DOCUMENTS

| | | | | |
|---|---|---|---|---|
| 3,379,336 | A * | 4/1968 | Stedfeld | 220/586 |
| 3,690,606 | A | 9/1972 | Pall | |
| 3,692,205 | A * | 9/1972 | Cowles et al. | 220/560.03 |
| 3,698,145 | A | 10/1972 | Newman et al. | |
| 3,764,277 | A * | 10/1973 | Hollis | 428/555 |
| 3,969,563 | A * | 7/1976 | Hollis, Sr. | 428/175 |
| 4,023,617 | A * | 5/1977 | Carlson et al. | 165/169 |
| 4,088,240 | A * | 5/1978 | San Miguel | 220/560.02 |
| 4,172,152 | A * | 10/1979 | Carlisle | 426/127 |
| 4,422,561 | A * | 12/1983 | Grosvenor et al. | 220/560.02 |
| 4,454,945 | A * | 6/1984 | Jabarin et al. | 206/524.3 |
| 4,539,244 | A * | 9/1985 | Beggs et al. | 428/116 |
| 5,547,096 | A * | 8/1996 | Kleyn | 220/4.14 |
| 5,653,836 | A * | 8/1997 | Mnich et al. | 156/98 |
| 6,003,283 | A * | 12/1999 | Hull | 52/783.18 |
| 6,010,027 | A * | 1/2000 | Fujii et al. | 220/592.2 |
| 6,135,238 | A * | 10/2000 | Arcas et al. | 181/292 |
| 6,595,382 | B2 * | 7/2003 | Ettlinger | 220/560.11 |
| 6,668,561 | B1 * | 12/2003 | Sheu et al. | 62/45.1 |
| 8,091,465 | B2 * | 1/2012 | Ravid et al. | 89/36.08 |
| 2004/0060304 | A1* | 4/2004 | Aceves et al. | 62/45.1 |
| 2005/0092756 | A1 | 5/2005 | Goggin | |
| 2007/0102433 | A1* | 5/2007 | Allidieres et al. | 220/560.11 |
| 2008/0264951 | A1* | 10/2008 | Tweet et al. | 220/560.02 |

OTHER PUBLICATIONS

International Preliminary Report on Patentability and the Written Opinion dated Jul. 4, 2013, in related International Application No. PCT/US2011/042439.

Notice of Allowance with translation for related Japanese Patent Application No. 2013-518665, dated Jun. 14, 2016, Japanese Patent Office. 4 Pages.

Allowed claims for Notice of Allowance for related Japanese Patent Application No. 2013-518665 dated Jun. 14, 2016. 4 Pages.

Extended European Search Report for PCT/US2011/042439 dated Jun. 10, 2016. 7 Pages.

Office Action for Japanese Patent Application 2013-518665 dated Jul. 7, 2015. 6 Pages.

* cited by examiner

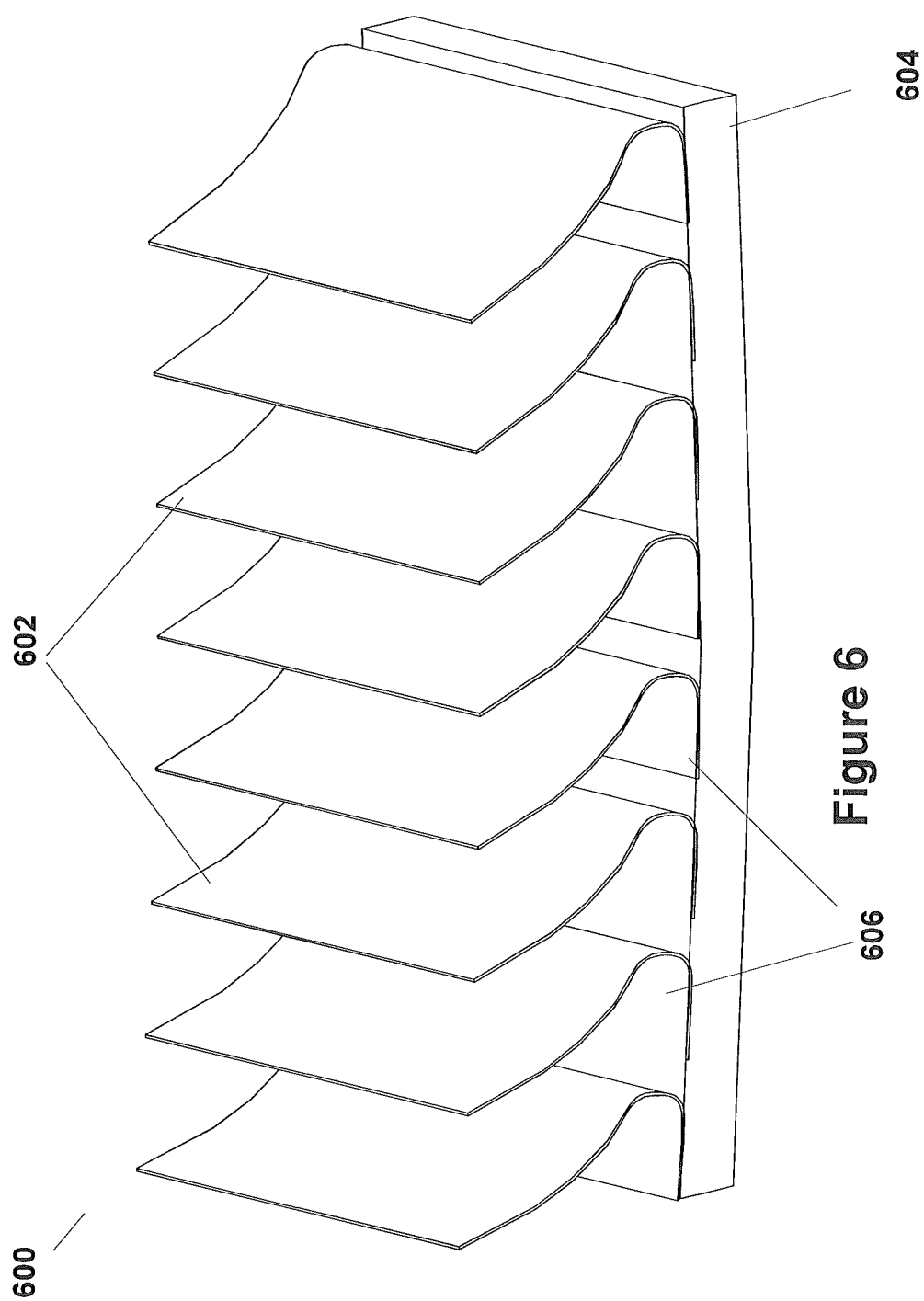

FLUID CONTAINER

RELATED APPLICATION

The present application claims priority to U.S. Provisional Application 61/359,502, filed on Jun. 29, 2010, which is herein incorporated by reference in its entirety.

BACKGROUND

1. Technical Field

The present invention is related to containers for the storage and/or transportation of fluid substances.

2. Discussion of Related Art

There is developing interest in containment vessels for the storage and transport of fluids, especially for alternative energy system fuels, for example hydrogen or natural gas, as well as for other fuels. Containment vessels, in addition to facilitating the containment of fluids should also provide for safety in the event of an unexpected event involving the containment vessel.

To date, little has been accomplished in improving the safety features of containment vessels, especially for fluids such as hydrogen. There has been very little innovation in the forms of containers since the 1980's, although materials and methods of construction have advanced significantly in pressure vessels and pipelines. Such advances in materials and methods have directly contributed to container safety by increasing the threshold of damage intensity necessary to initiate catastrophes. Other advances in additives and formulations of fluids have increased the safety of containing them. One advancement in container safety is described in Goggin, U.S. Pat. No. 7,694,840, which describes an innovation in the form of containment vessels that fundamentally adds to their safety in the event of a failure.

Therefore, there is an immediate need for safer advanced containers for the storage and transportation of fluid substances.

SUMMARY

In accordance with embodiments of the present invention, a container includes a container wall; and one or more flow impeding structures coupled to the container wall, wherein at least one of the one or more flow impeding structures is a multi-sheet layer that deforms to impede flow in a failure of the container wall. In some embodiments, the multi-sheet layer includes cavities formed between individual sheets.

In some embodiments, a container includes a contents region; and a multi-sheet region that includes at least one multi-sheet layer forming an interface with the contents region and with an ambient surrounding region. In some embodiments, a multi-sheet layer includes a plurality of planar layers; and one or more cavity forming layers positioned between the plurality of planar layers.

These and other embodiments will be described in further detail below with respect to the following figures.

BRIEF DESCRIPTION OF THE DRAWINGS

FIG. 6 illustrates another multi-sheet embodiment according to the present invention.

Figure 1A:
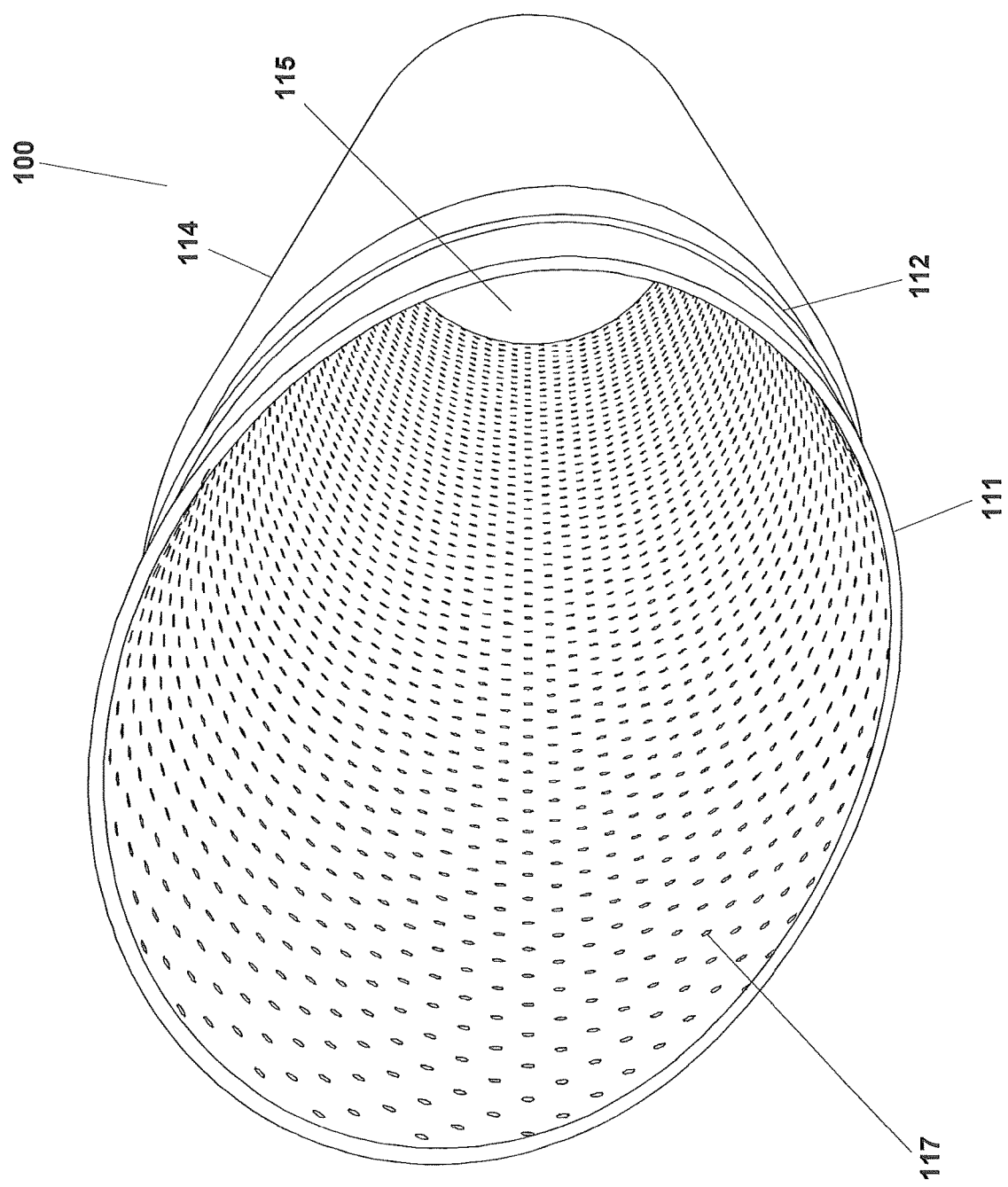
FIGS. 1A and 1B illustrate a pipeline according to some embodiments of the present invention.

In the drawings, elements having the same designation have substantially the same function. Further, drawings are not to scale. Objects are drawn for example only and relative sizes are not accurate. Further, drawings are provided to depict certain concepts and may be exaggerated to better illustrate the principles of embodiments of the invention.

DETAILED DESCRIPTION

In the following description specific details are set forth describing certain embodiments of the invention. It will be apparent to one skilled in the art that the present invention may be practiced without some or all of these specific details. The specific embodiments presented are meant to be illustrative of the present invention, but not limiting. One skilled in the art may realize other structures, materials, and/or relative locations of components that, although not specifically described herein, is within the scope and spirit of this disclosure.

Some embodiments of the invention operate to help control potentially catastrophic events that may occur with the container, such as a breach. Such an event may become catastrophic if the fluid flow is not controlled during the event. A few related catastrophic events can suffice to terminate the adoption of alternative energy or chemical processing innovations. Often the most hazardous disaster events are mixed-component and mixed-mechanism "chain reactions" wherein a container failure is a necessary link in the chain. Many times, the chain of events that may lead to a catastrophic failure rather than simply an inconvenient breakdown can be broken by appropriate flow control during the event.

Some embodiments of the present invention provide structures that improve the safety of a wide variety of containers. In some embodiments, the same structures can also improve the economics of operations of some embodiments of containers for particular fluids.

Containers can be any device that restricts, or attempts to restrict, the location of a fluid, for example pipelines or tanks. The term 'container' is used herein as a succinct term for any fluid containment device Containers restrict the location of portions of their fluid contents, or of its totality, while some may also restrict the location of all or part of sections of the container, or of all or part of an external impinging fluid. For example, some embodiments of a container can restrict where the fragments of a burst container can go, while others can restrict the locations where a 'fluid' (e.g. shrapnel travelling ballistically through air, which would otherwise puncture the container) might penetrate. Some embodiments of the present invention may be included in mobile (e.g. vehicular) containers, transportable (easily relocated but not necessarily functional while in motion) containers, as well as in stationary containers.

A number of kinds of devices may be referred to as containers. Among the physical containers that might include embodiments of the present invention are bottles, tanks, pipeline, hoses, bowls, vats, vessels, and wrappers. Containers can include, for example, vehicle fuel tanks, supertanker storage tanks, fork-lift fuel tanks, pipelines, or stationary storage vessels.

Some embodiments of the present invention are applicable to the containment of materials such as, for example, fluids, vacuum, and combinations of materials capable of flow. In the present disclosure, 'flow' refers to a process in which pure or mixed substances are moving from location to location. Those substances might be mixtures of particles, grains, chunks, shrapnel, debris and even artifacts, as well as substances mixed into vacuum, gases, liquids, slurries, and/ or plasmas. Their flow could be governed, for example, by particle scattering, viscous forces, gravity, chemical effects, ballistic trajectories, or other mechanisms (e.g., electrostatic, magnetostatic, or electromagnetic coupling).

Some embodiments of the present invention provide for better containment of fluids or distribution of their constituents within the container. Containment refers to the control of the location of all or portions of the fluid. Containment can be performed during valuable operations, unanticipated operations, undesirable circumstances, off-nominal operations, partially damaged operations, as well as accidental damage to the container. Besides improving safety and mitigating the hazards and/or economic losses due to accidents, improved containment can offer improved control and operating economy of the container and its fluid contents. Some embodiments of the present invention can be utilized, for example, to control sloshing, stratification, fill rate, release rates, and thermal transients during filling and/or emptying, in addition to containment during unintended events.

Some embodiments of this invention can provide fluid containment statically, dynamically, or transiently. A containment according to some embodiments of the present invention can significantly reduce the rate of fluid flow in particular situations. Some embodiments can impede flow on some timescales, without necessarily reducing it on other timescales. For example, filling of the container may be performed unimpeded while a breach of the container is impeded. Some embodiments can impede flow in particular locations or directions within the container, without necessarily reducing it in others.

Some embodiments of the present invention significantly reduce flow entirely within the container, while other embodiments may also reduce flow across the interface between the container and its surroundings. Some container embodiments can be open-ended, such as vats or pipelines, others can be closed, such as a hazardous material bags, pressure vessels, fuel storage tanks, or other such structures. Some containers include plumbing, for example devices to allow the ingress and egress of the fluid stored in the container (e.g. similar to the majority of pressure vessels), and couplings to couple fluids into or out of the container.

Therefore, containers may include components such as, for example, inlets, outlets, walls, interior baffles, exterior shells, lids, covers, pressure relief devices, burst diaphragms, valves, and a myriad of plumbing devices. Liners and coatings are conventional container components that protect other solid components from fluid migrating into them and subsequently attacking their structural or chemical performance, or fluids permeating through those other components (i.e. walls, shells, etc.).

Containers may include other flow restricting structures. For example, maritime tanker vessels and liquid fueled rockets may include internal slosh baffles. In order to maintain control of a vehicle wherein the container and its contents constitute a significant portion of vehicle mass, baffles can impede internal fluid flow and thereby restrict the dynamic movement of the contained fluid. Other devices designed to impede internal flow of fluid include spacecraft propellant tanks designed to expel liquids when in orbit, gun barrel extensions conventionally called 'silencers', and vehicle acoustic emissions from exhaust pipes in devices conventionally called 'mufflers'.

Some geometries for the control of fluid flow through a container in the event of, for example, a breach are described in U.S. Pat. No. 7,694,840 to Goggin, which is herein incorporated by reference in its entirety. Goggin describes a containment vessel for substances that allows for the controlled release of fluids and controlled flow of fluids through the structure.

Structures according to some embodiments of this invention can be realized by a solid material, including slowly creeping viscous or gelled matter, as well as conventionally bonded matter, whose shape can change due to fluid dynamic forces to impede flow. Such shape changes can include folding, stretching, bending, and buckling in response to particular flow conditions.

In some embodiments, at least one structure can be formed of one or more 'sheets." A sheet is a structure with a surface extent substantially larger than its thickness. In some embodiments, sheets can be structurally attached to other sheets or to other portions of the container. However, the functionality of flow control is provided by sheets that channel flow. Cavities can be formed between sheets. Cavities may be open or closed. Cavities provide a redirection of the flow, thereby altering the time scale of flow impediment, or restriction of flow in at least one direction. Gaps are cavities formed between sheets to enable nominal flow in directions perpendicular to the sheets thickness (i.e., along the sheet surface area), but in accidental or transient flow sheets can collapse the gaps or rearrange themselves to block most flow.

The conventional container components that withstand mechanical loads due to differential pressure (e.g. pipeline walls, container pressure shells) and to mounting forces (e.g. bosses, flanges, skirts) can provide anchorage locations for multi-sheet structures to retard their relative motion within containers according to some embodiments of the present invention.

Figure 1B:
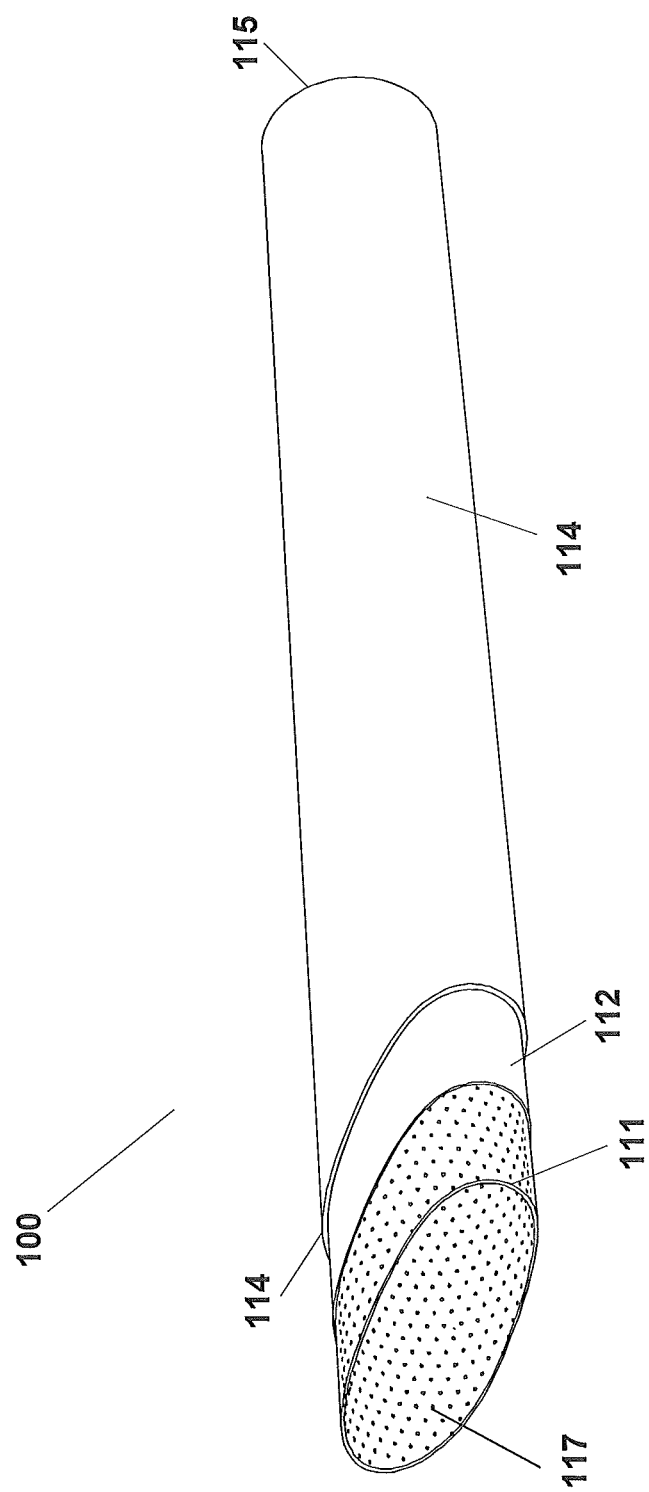

FIGS. 1A and 1B show a pipeline 100 according to some embodiments of the present invention. As shown in FIG. 1A, pipeline 100 is lined with multiple concentric layers, of which for exemplary purposes two are shown—an inner layer 111 and a middle layer 112—within an outside pipe wall 114. In some embodiments, there may be any number of layers, two layers (layers 111 and 112) are shown here for illustrative purposes only. In general, layers 111 and 112 may be single-sheet structures or multi-sheet structures. In this example, the two different layers 111 and 112 have been assembled adjacent to the inner face of the pipeline wall 114 so that layer 112 shields the ability of layer 111 to function from gross gouges and bumps that may exist on the inside diameter of wall 114, as well as from the extreme roughness likely to appear on the edges of any breach such as a crack or rupture in wall 114. Under normal operation, fluid flows along pipeline 100 through opening 115, which is adjacent to inner layer 111.

FIG. 1A shows an oblique view of a cut away section of pipeline 100 The oblique view in FIG. 1A of pipeline 100 is tilted so that the axis of pipeline 100 is almost perpendicular to the view, in order to illustrate the relationship between layers 111 and 112 with respect to wall 114. FIG. 1B shows a side view of pipeline 100 with enough cut-away to illustrate layers 111 and 112 with respect to wall 114.

In pipeline 100 of the embodiment illustrated in FIGS. 1A and 1B, inner layer 111 can be a perforated and textured layer, which may itself be composed of multiple textured sheets that are weakly sealed to one another, for example by a slight radial compression. Inner layer 111 may be constrained by radial compression to slide within a pliable smooth-inner-surface layer formed by middle layer 112, or inner layer 111 may be weakly adhered within middle layer 112 so that the inner layer 111 is able to break away from the middle layer 112 to be pulled by fluid forces into the breach created by a rupture in pipeline 100. Further, inner layer 111 may include passages 117 to allow fluid between sheets of inner layer 111.

The outer surface of middle layer 112 can also be constrained by radial compression or weak adhesion to remain fixed within pipeline structural wall 114. As discussed above, inner layer 111, middle layer 112, and structural wall 114, surround a hollow core opening 115 and provide minimal impediment to intended flow along pipeline 100. As shown in FIGS. 1A and 1B, fluid is constrained to hollow core opening 115 and within passages 117 of inner layer 111 of pipeline 100 during nominal operation.

In general, any number of layers can be included in pipeline 100. Each of the layers provide flow restriction perpendicular to the thickness of layers, and consequently to wall 114 of pipeline 100. In general, although FIGS. 1A and 1B illustrate a long and cylindrical pipeline 100, pipeline 100 may be of any cross-sectional shape and may include flattened portions of walls or non-straight tubes axes, for example such as elbows and T connectors. Further, some embodiments can include sheet structures employed within core 115 in order to control the flow of fluid, to promote mixing, or to prevent segregation. Such further structures may be employed at the expense of additional pipeline pumping power requirements.

Figure 1C:
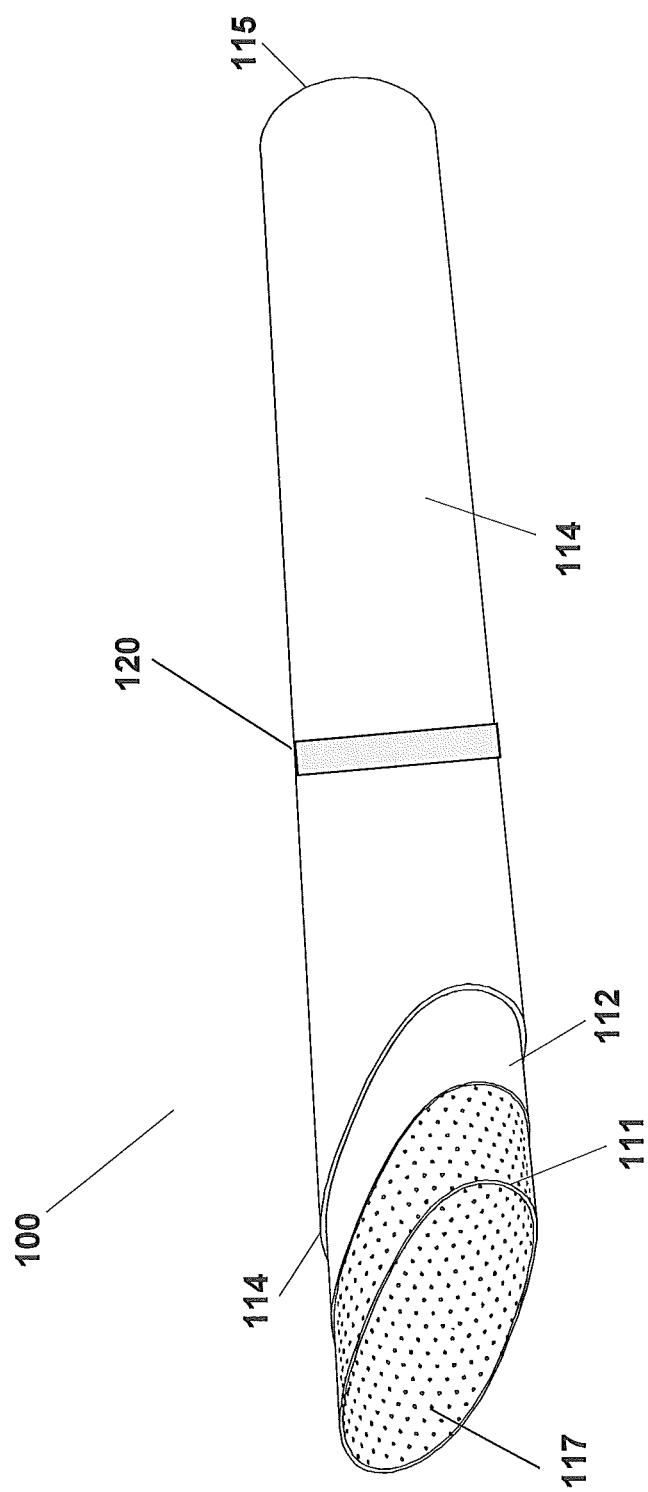
FIG. 1C illustrates fluid control within a pipeline similar to that shown in FIGS. 1A and 1B.

FIG. 1C illustrates a pipeline 100 with a flow control device 120 within core 115. Flow control device 120 may serve to provide mixing, separation, laminar flow, turbulent flow, or other functionality to control the flow of fluids within pipeline 100. Pipeline 100 may include multiple ones of devices 120 and further device 120 may be co-extensive with the length of pipeline 100, and may utilize any portion of the cross-sectional area of core 115.

Figure 1F:
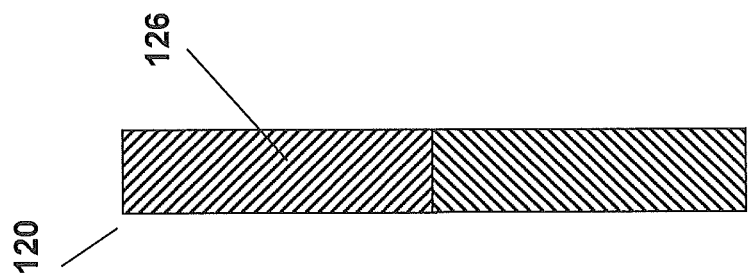
FIGS. 1D, 1E, and 1F provide some examples of fluid control devices that can be utilized within pipeline core.
Figure 1E:
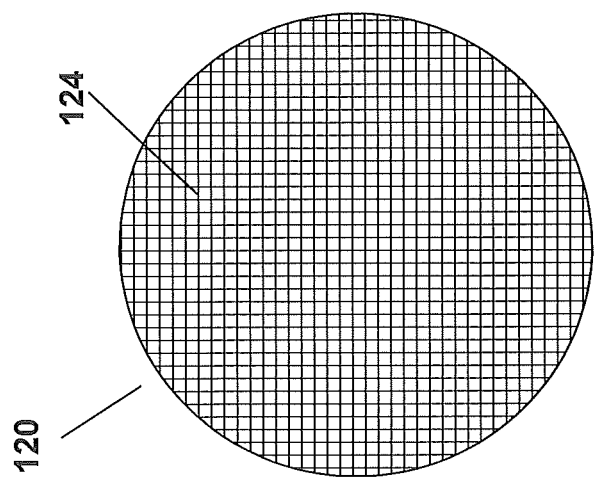
Figure 1D:
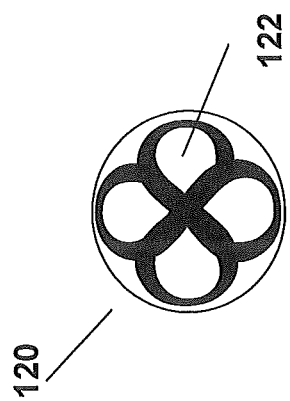

FIGS. 1D, 1E, and 1F illustrate examples of flow control device 120. Device 120 in FIG. 1D illustrate a mixing device and includes fins 122, which are similar to fan blades. Fins 122 impart swirl to the flow in core 115. Successive stages of fins 122 imparting clockwise and counterclockwise swirl can promote mixing.

Device 120 illustrated in FIG. 1E includes louvers 124. Louvers 124 are cross-hatched and parallel to suppress turbulence and promote laminar flow. Louvers 124 can inhibit mixing and preserve stratification of the fluid in core 115.

Device 120 illustrated in FIG. 1F illustrates a side view of impinging louvers 126. Louvers 126 can be angled internally with respect to an axis of core 115 to promote mixing and turbulence and reduce stratification.

Figure 2A:
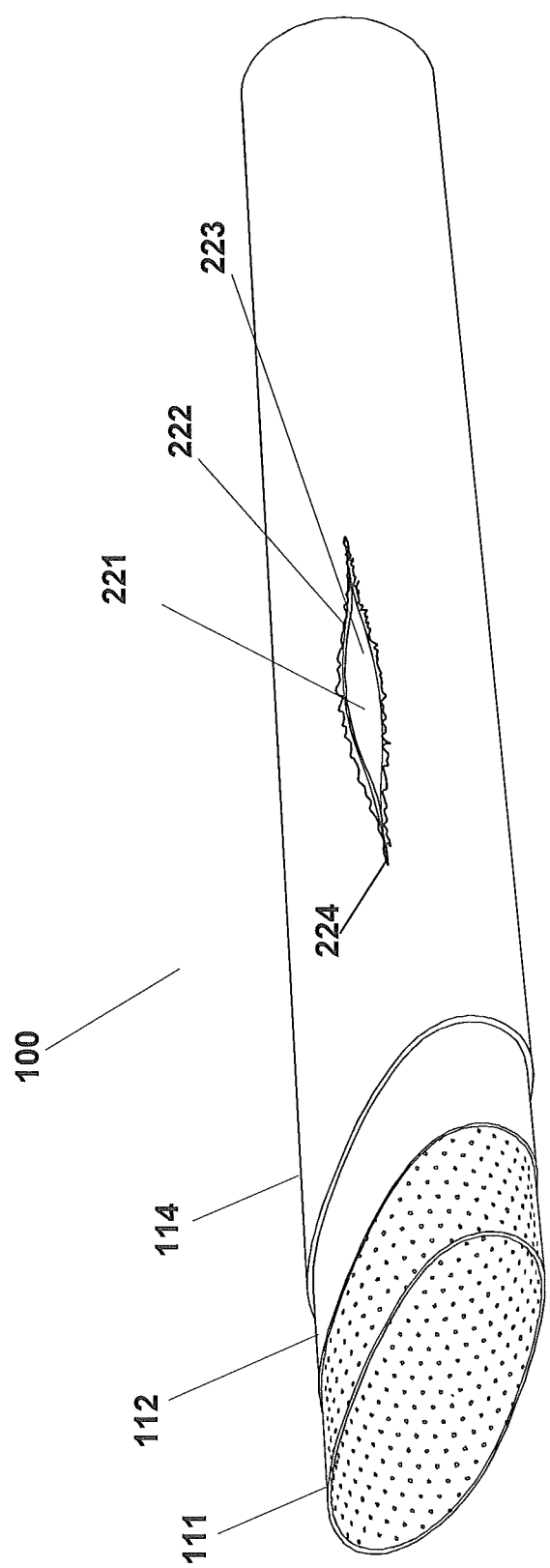
FIGS. 2A, 2B, 2C, and 2D illustrate a breach in the wall of the pipeline container illustrated in FIGS. 1A and 1B.

FIG. 2A shows pipeline 100 of FIGS. 1A and 1B after a portion of pipeline 100 has ruptured to form a breach 221. For illustration purposes, breach 221 may be the most common form of breach known as a running flaw, wherein a crack propagates nearly along the axis of the tube for considerable distance. Other forms of pipeline rupture are also common, such as penetration damage as may be caused by a fork lift or "ditch witch" blade, and are also mitigated by this embodiment. As shown in FIG. 2A, a bulge 223 is formed when the largely-intact multi-sheet inner layer 111 partially protrudes through a breach 221. Further, smoothed edges 222 are formed when middle layer 112 is forced through breach 221.

Figure 2B:
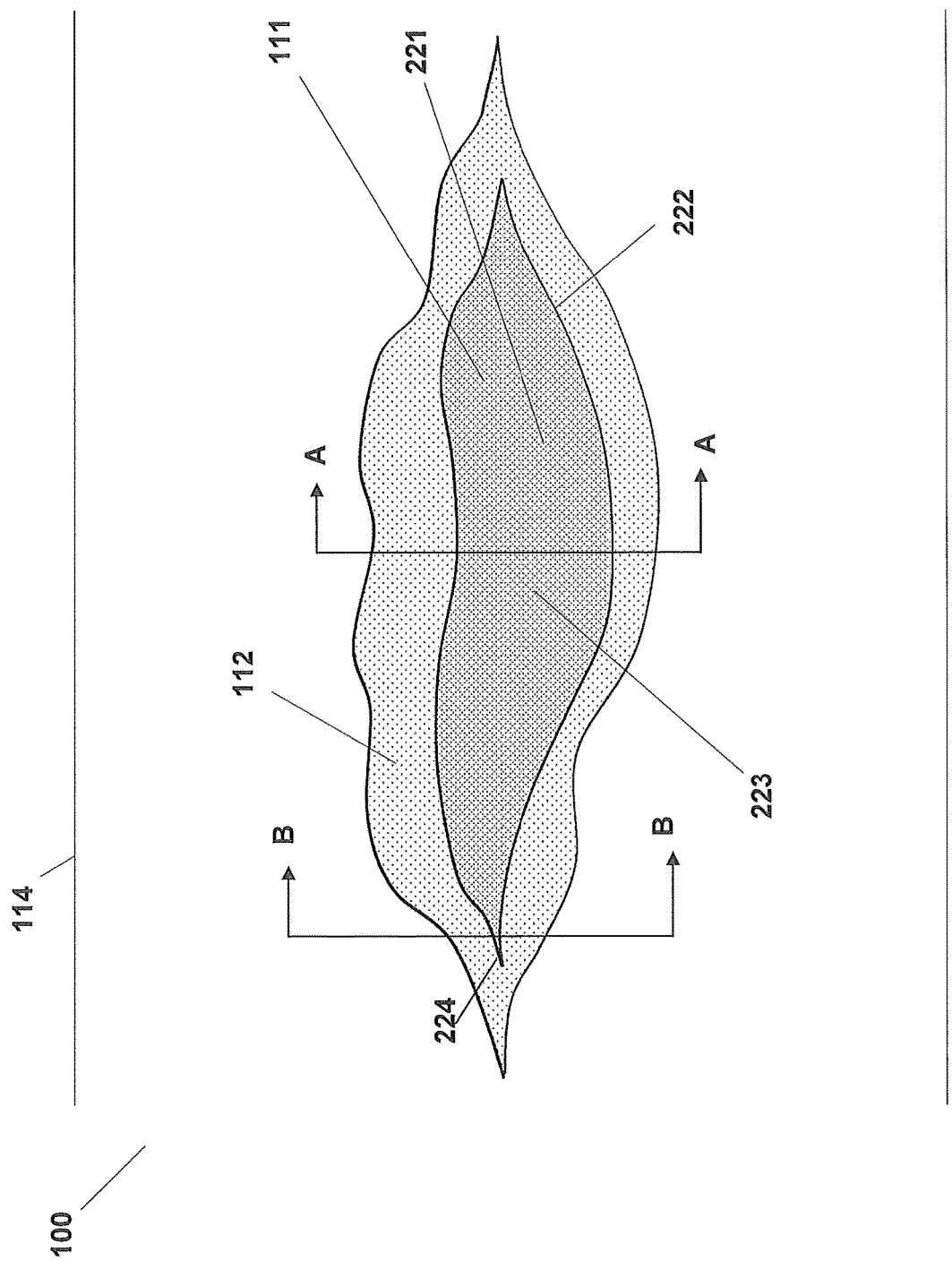
Figure 2C:
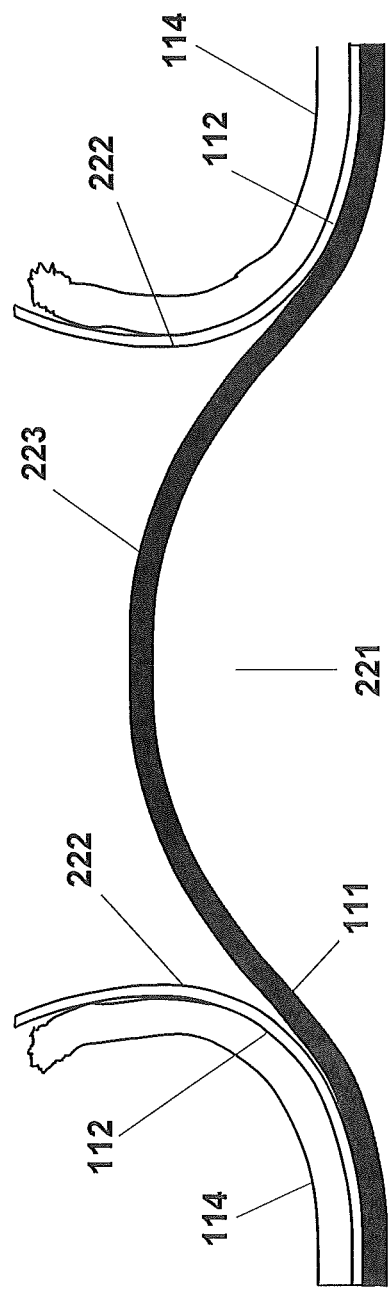
Figure 2D:
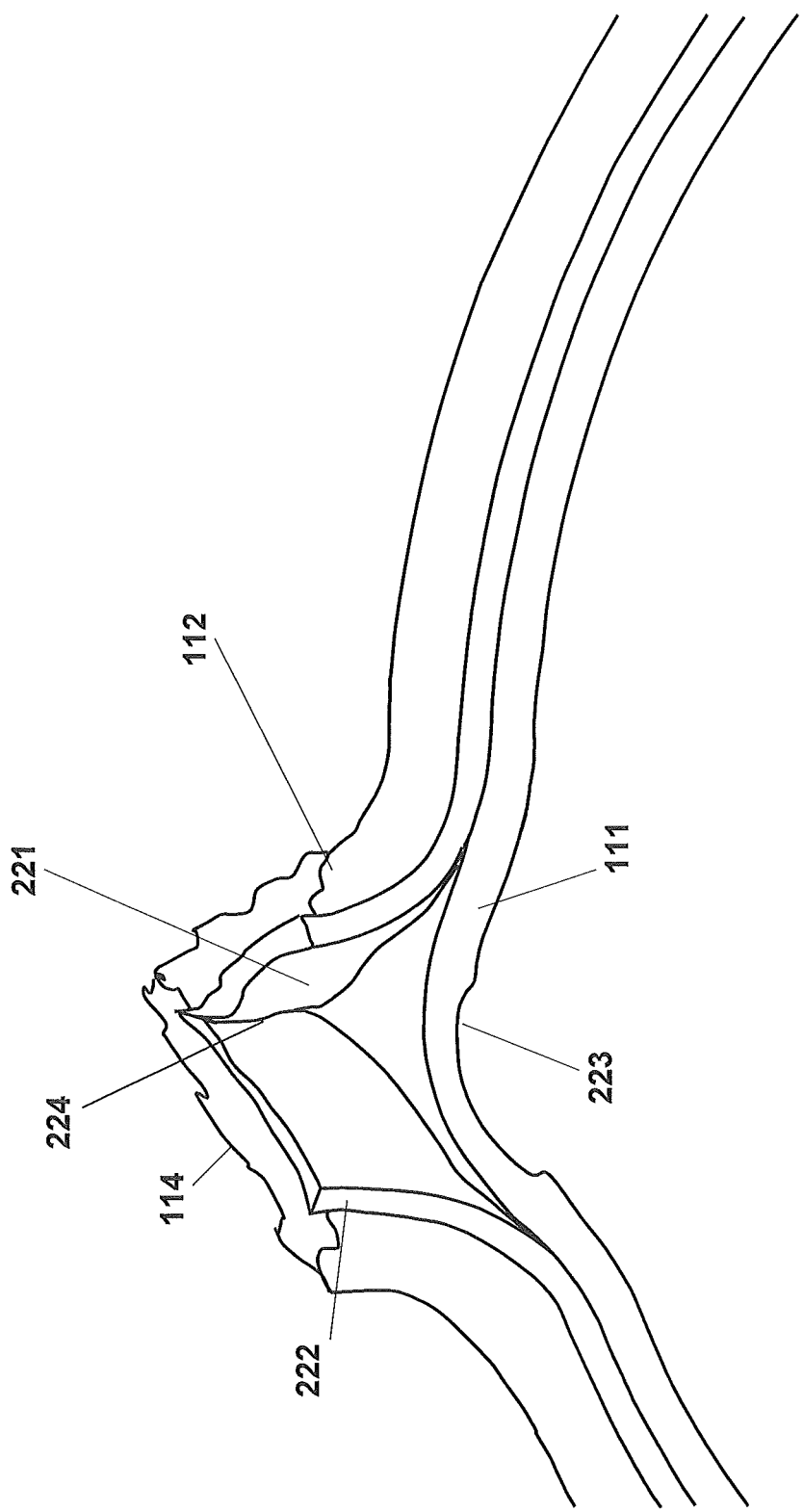

FIGS. 2B, 2C, and 2D further illustrate operation of layers 111 and 112 at a zoomed-in view of breach 221. FIG. 2B illustrates breach 221 in wall 114 external to pipeline 100. As shown in FIG. 2B, middle layer 112 is protruding through breach 221 to smooth out the rough surfaces of wall 114 around breach 221. Typically at a breach 221, the material of wall 114 is disrupted causing rough and jagged edges around breach 221.

FIG. 2C illustrates a cross section along the direction A-A shown in FIG. 2B of breach 221. As is illustrated in FIG. 2C, breach 221 formed in a gap in wall 114 is lined by broken middle layer 112. Middle layer 112 serves to smooth the rough edges in wall 114 to form smooth edges 222. Inner layer 111, which then protrudes into breach 221 to form a bulge 223, is protected from puncture by the jagged edges of breached wall 114. In such a structure, inner wall 111 stretches and its multi-sheet structure deforms itself to provide for bulge 223, thereby restricting flow of fluid perpendicular to wall 114.

As shown in FIGS. 2B and 2C, middle layer 112 and inner layer 111 have erupted through breach 221 in wall 114, however only the wall 114 and middle layer 112 have ruptured in breach 221. Middle layer 112 has torn itself just outboard to form a smooth orifice 222 within breach 221. Inner layer 111 has slid, bulged, and extruded itself into a different layer shape, while moving driven by fluid differential pressure from core 115, through orifice 222 to form a distorted but intact flow impeding barrier at breach 221.

FIG. 2D further illustrates the action of middle layer 112 and inner layer 111 in the presence of breach 221 in wall 114 at crack tip 224. FIG. 2D is a cross-sectional view along B-B shown in FIG. 2B. As shown in FIG. 2D, at breach 221 in wall 114 wall material may be pushed out and may be jagged. Middle layer 112 lines the jagged edges of broken wall 114 to form smooth edge 222. Meanwhile, inner layer 111 reforms itself to bulge 223 into breach 221 to continue sealing pipe 100. The distortions created by such relative motion within layer 111 becoming a barrier in breach 221 combine with the deliberately designed multiple sheet structure of layer 111 to impede flow through and around breach 221.

In some embodiments, middle layer 112 is a single sheet of a smooth substance. As such, middle layer 112 may be a single sheet of plastic, rubber, ductile metal, or other material that can form smooth edges 222.

Figure 3A:
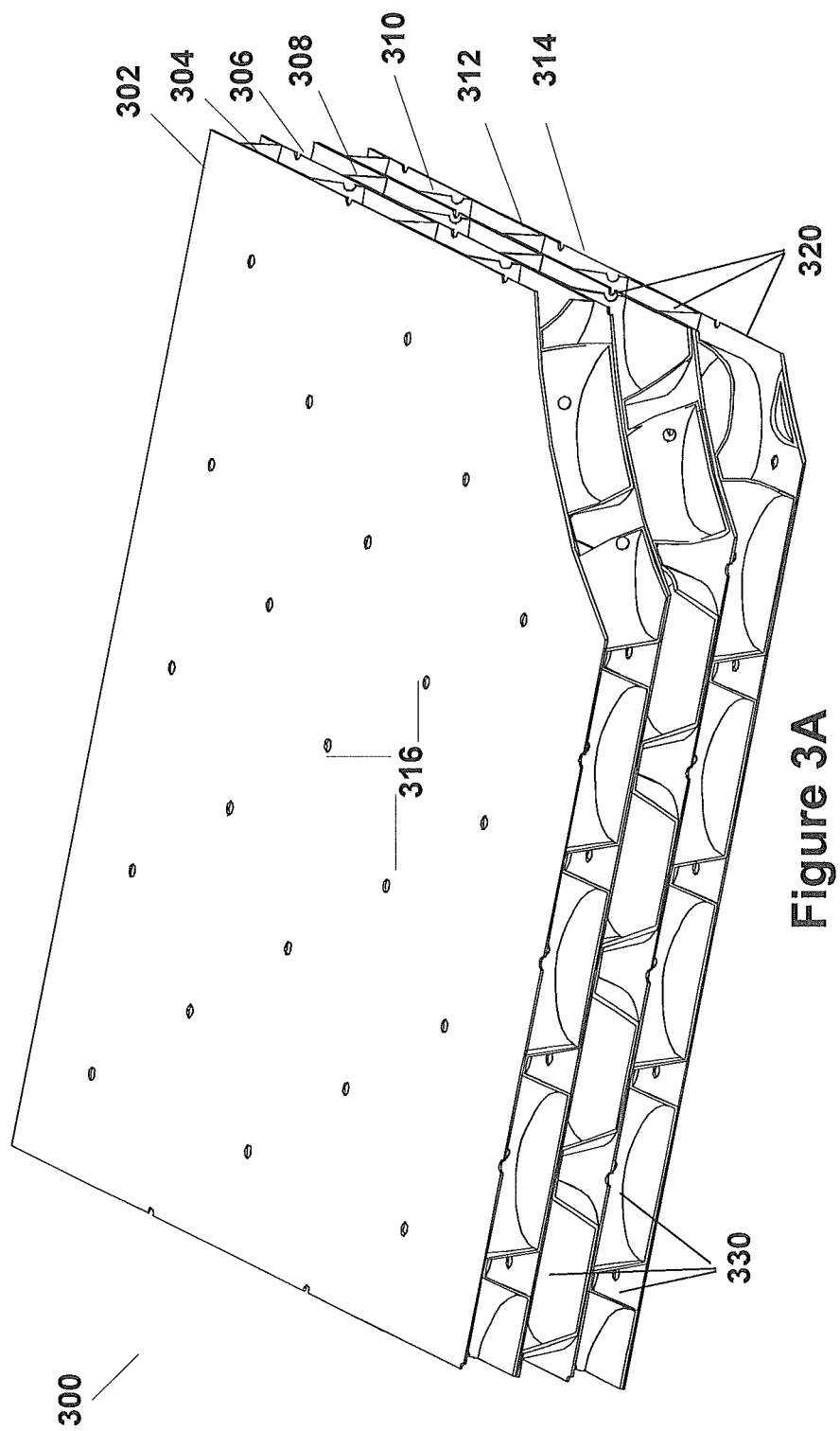
FIGS. 3A and 3B illustrate a multiple sheet embodiment of the present invention that could be utilized, for example, as the inner layer 111 in the pipeline 100 illustrated in FIGS. 1A and 1B, or employed by itself as a flow impeding layer.

FIG. 3A illustrates an embodiment of a layer 300 that could be employed to impede flow as, for example, inner layer 111 of pipeline 100 illustrated in FIGS. 1A and 1B, or employed by itself adjacent to the walls or throughout the volume of any container. As shown in FIG. 3A, layer 300 is a multiple sheet structure. This view is a square section of a wider layer, with a corner further cut away to illustrate the internal arrangements formed by a plurality of individual sheets 320. As shown in FIG. 3A, layer 300 is shown to include multiple textured sheets 302, 304, 306, 308, 310, 312, and 314, collectively sheets 320.

Figure 3B:
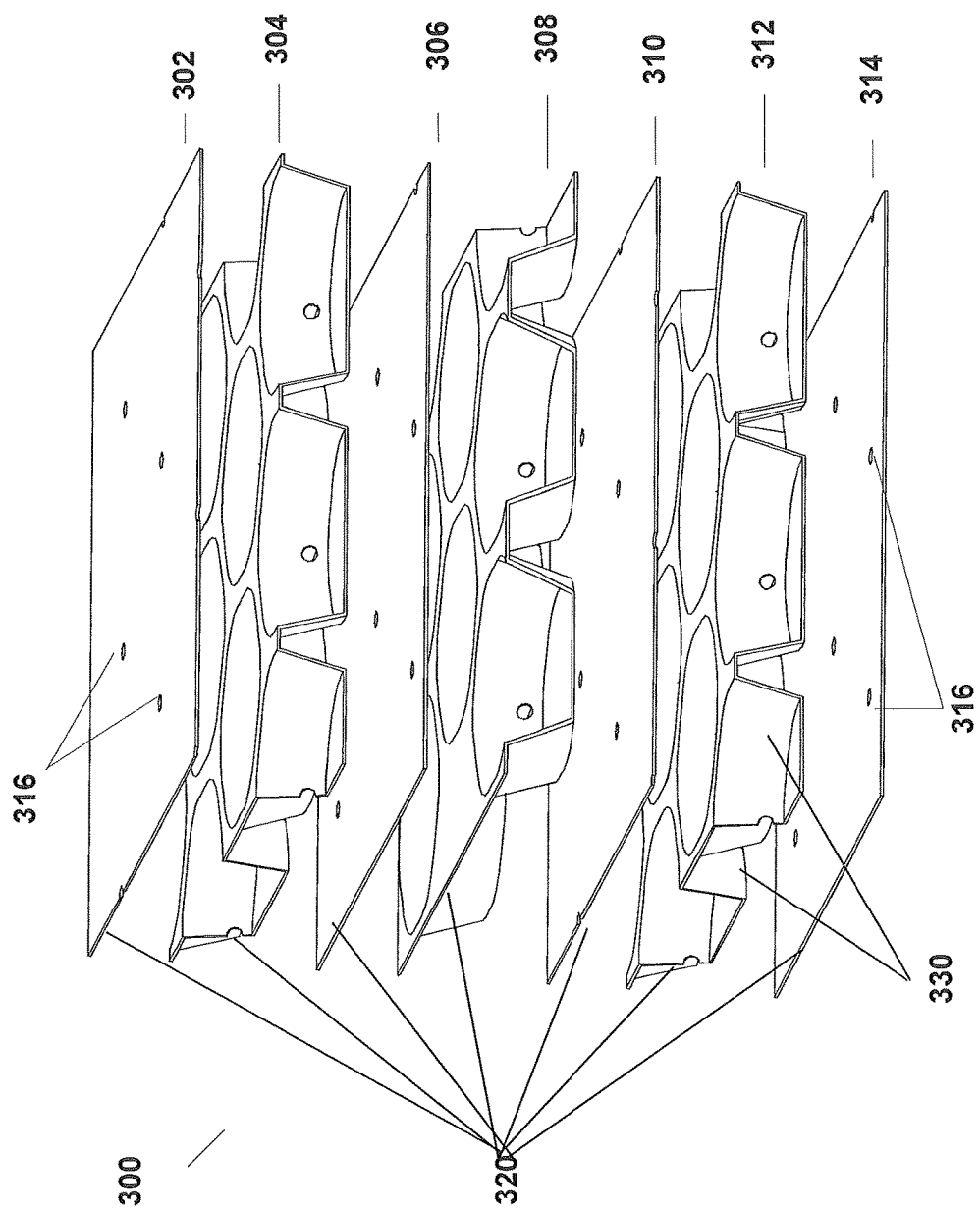

FIG. 3B illustrates an exploded version further showing individual sheets 320 of layer 300. In general, any number of individual sheets can be utilized in a multi-sheet structure. As shown in FIGS. 3A and 3B, the sheets of layer 300 can be arranged such that cavities 330 are formed within layer 300 and further, passages 316 can be formed to allow for fluid flow through layer 300.

As shown in FIGS. 3A and 3B, features on one sheet can be aligned relative to features on neighboring sheets. As shown in FIGS. 3A and 3B, layers 302, 306, 310, and 314 are flat sheets with no structure in the vertical direction of the thickness of layer 300 (i.e., perpendicular to the large surface area of layer 300). Sheets 304, 308, and 312 can have structure in the vertical direction, e.g. the direction along the thickness of layer 300. As shown in FIGS. 3A and 3B, sheets 304, 308, and 312 can be "muffin-tin" structures arranged such that spatial volumes in one of layers 305, 308, and 312 are not aligned with similar spatial volumes in the others of layers 305, 308, and 312.

The geometry of features on multiple textured sheets 320 (sheets 302, 304, 306, 308, 310, 312, and 314) is illustrated for clarity in FIGS. 3A and 3B as a hexagonal close packed tiling of the plane of each of sheet 304, 308, and 312. Also for clarity, only three repetitions of two sheet geometries, sheets 302, 306, 310, and 314, interspersed with sheets 304, 308, and 312 are illustrated.

Layer 300 may include any number of repetitions of individual sheets. The multiplicity of sheets is illustrated with a low number of sheets in FIGS. 3A and 3B, and their periodicity is illustrated large enough perpendicular to the surface area of the sheets to provide clarity. However, more layers and finer perpendicular layer spacing can substantially increase flow impediment, while as few as two layers and perpendicular periodicity as large as roughly 50% of the dimensions of a container within which layer 300 is utilized can still provide flow impediment. Further, although FIGS. 3A and 3B illustrate an example where sheets 320 are repeated, each of the sheets 320 can be different in order to optimize a performance parameter of layer 300. Likewise, other texture and hole geometries that periodically tile the plane of the sheets 320, including triangles, rectangles, or trapezoids in different orientations, as well as other tilings such as aperiodic (e.g., Penrose), chaotic, and random tilings can be utilized as individual ones of sheets 304, 308, and 312.

In some embodiments sheets 320 might be planar (e.g. unbent sheet metal), but in some embodiments they are not, and in some embodiments they may be penetrated with holes 316. In some embodiments, layer 300 may be formed from stacks of bed sheets or corrugated sheet metal, for example, of mostly local parallel structures whose sheets 320 are not strictly planar. Other sheets 320 can arrange themselves into space-packing cells or compartments (cavities), with or without seals between individual sheets 320. Layer 300 can be bent in any pattern, for example to form a cylindrical structure or to conform to the curvature of a structural shell, or to fasten onto other structures.

Thicknesses of sheets 320 need not be constant. Sheets 320 may or may not be fixed to one another in their nominal operation, but are fixed to the container in normal operation to remain in place and in the proper orientation in order to impede transient flow. Layer 300, then, can be formed from a plurality of sheets 320, separating adjacent cavities 330 with solid sheet materials that act as impediments to flow. The shape of cavities 330 can be fixed in some embodiments, or cavities 330 may dynamically change shape to restrict flow under particular conditions.

Figure 3C:
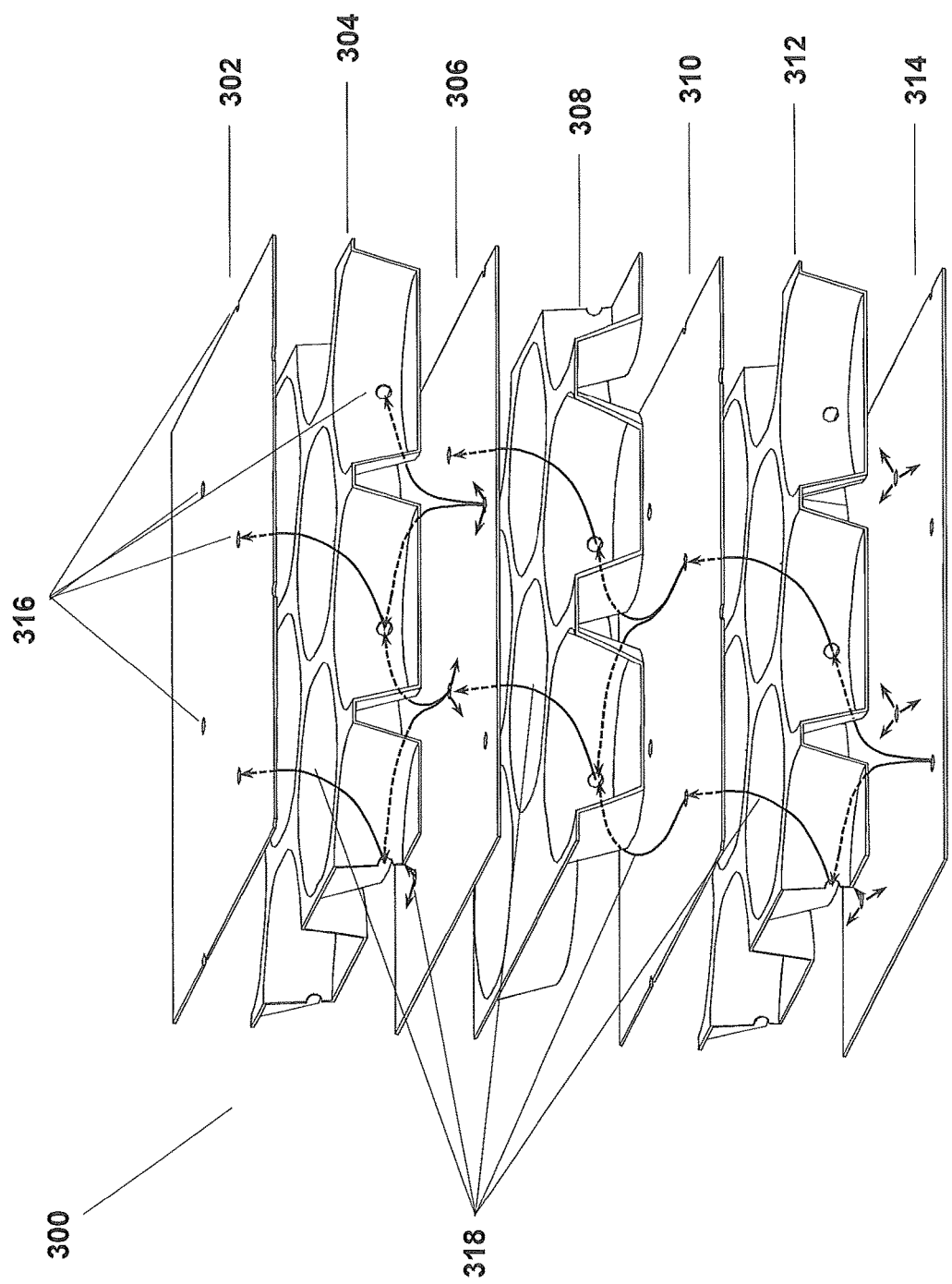
FIG. 3C illustrates fluid flow between sheets of the multi-sheet structure illustrated in FIGS. 3A and 3B.

FIG. 3C illustrates some example flow patterns 318 in layer 300 illustrated in FIGS. 3A and 3B. During nominal operation, fluid flows between compartments through periodic orifices 316 in passageways formed by textures in sheets 320. Orifices 316, for example, correspond to holes 117 shown in FIGS. 1A and 1B in inner layer 111. These orifices 316 in sheets 320 are deliberately not aligned, so that a jet formed by one orifice cannot flow directly into another orifice without stagnating on the surface of one of sheets 320.

The size and shape of cavities 330, which can be filled with fluid, can be set by the spacing of the sheets, and by the dimensions and relative locations of holes 316 in sheets 320. The size provides a spatial scale for flow geometries explicitly designed to restrict flow on a particular timescale. That spacing scale can vary from as short as 30 nanometers for micro-batteries to 30 meters for supertankers. In some embodiments, cavities 330 collapse in the event of rupture or penetration, changing relatively unimpeded flow during nominal inter-sheet filling and expulsion into choked-off flow, orifice-impeded flow, or enhanced-turbulence flow in the event of accidental breach.

Flow paths 318 between sheets 320 can be parallel to the surfaces of sheets 320 and can be relatively smooth, or can force turbulence by surface features on sheets 320. As illustrated in FIG. 3C, flow paths 318 can be nearly straight, or they may be tortuous. Serpentine paths 318 can impose very high drag on fluid flow with a series of stagnating, impinging turns. Opening and pinching off paths 318 can be desirable in some embodiments for leak control.

In some cases, flow paths 318 may be branching flow paths may be provided at holes 316 in sheets 320. Branching flow paths may separate fluids of differing composition, which can realize the objectives of some containers to segregate fluids of differing composition. Converging branches and turbulence-inducing surface textures on sheets 320 can promote the objective of other containers of mixing their fluid constituents.

In some embodiments, the thermal properties of sheets 320 can be arranged to achieve particular thermal goals. Thermal conduction across sheets 320 can promote the equilibration of inlet fluid with current contents, improving operational economics in some embodiments adapted for containing compressed gases, and improving center of mass location control in other embodiments where the fluid would otherwise be prone to gravity-driven density stratification. Resistance to thermal conduction can be enhanced in some embodiments to retard thermal equilibration of inlet fluids with prior contents, improving other aspects of their operations economics.

Figure 4A:
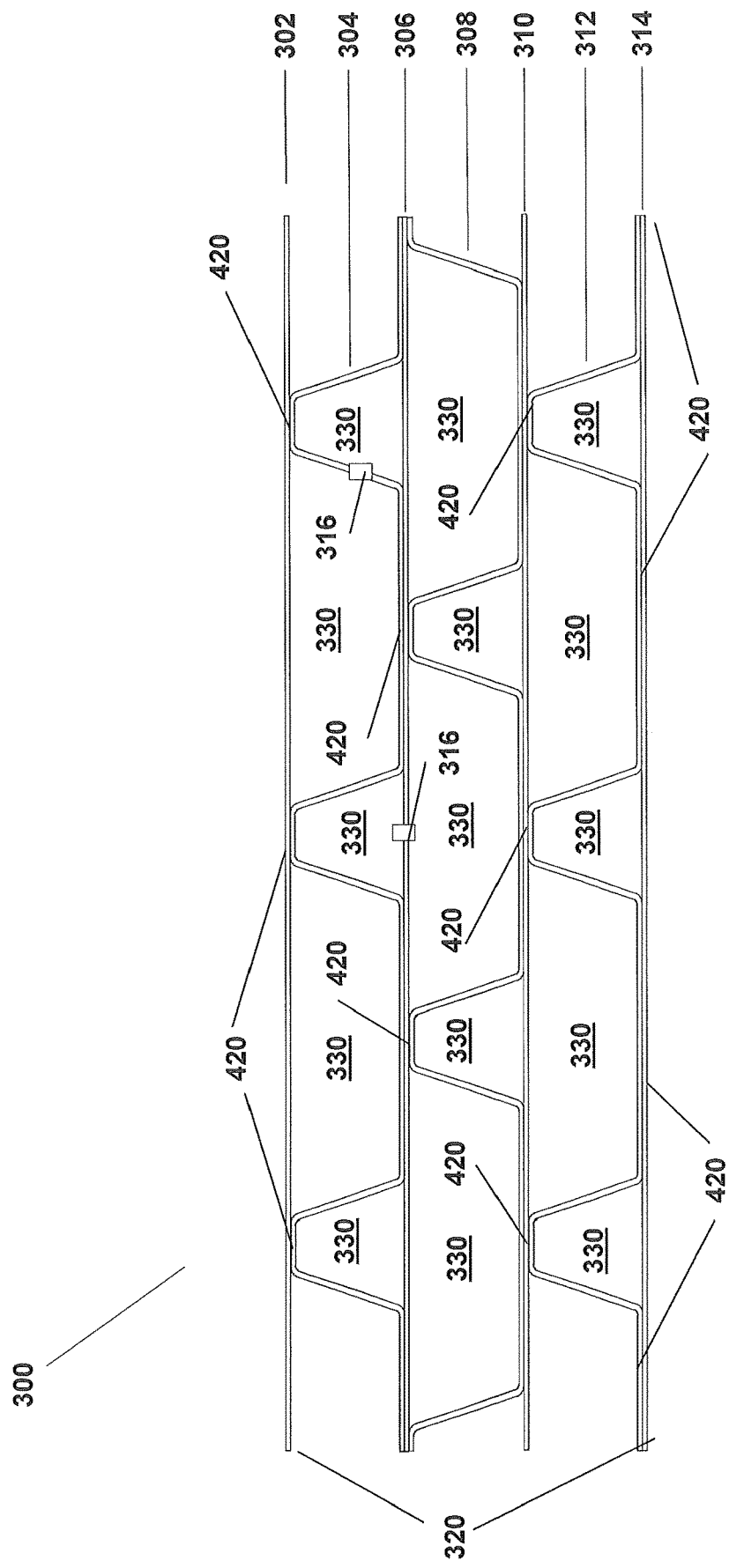
FIGS. 4A and 4B illustrate a cross-section of the multiple sheet embodiment of FIGS. 3A and 3B before and after breach, respectively.
Figure 4B:
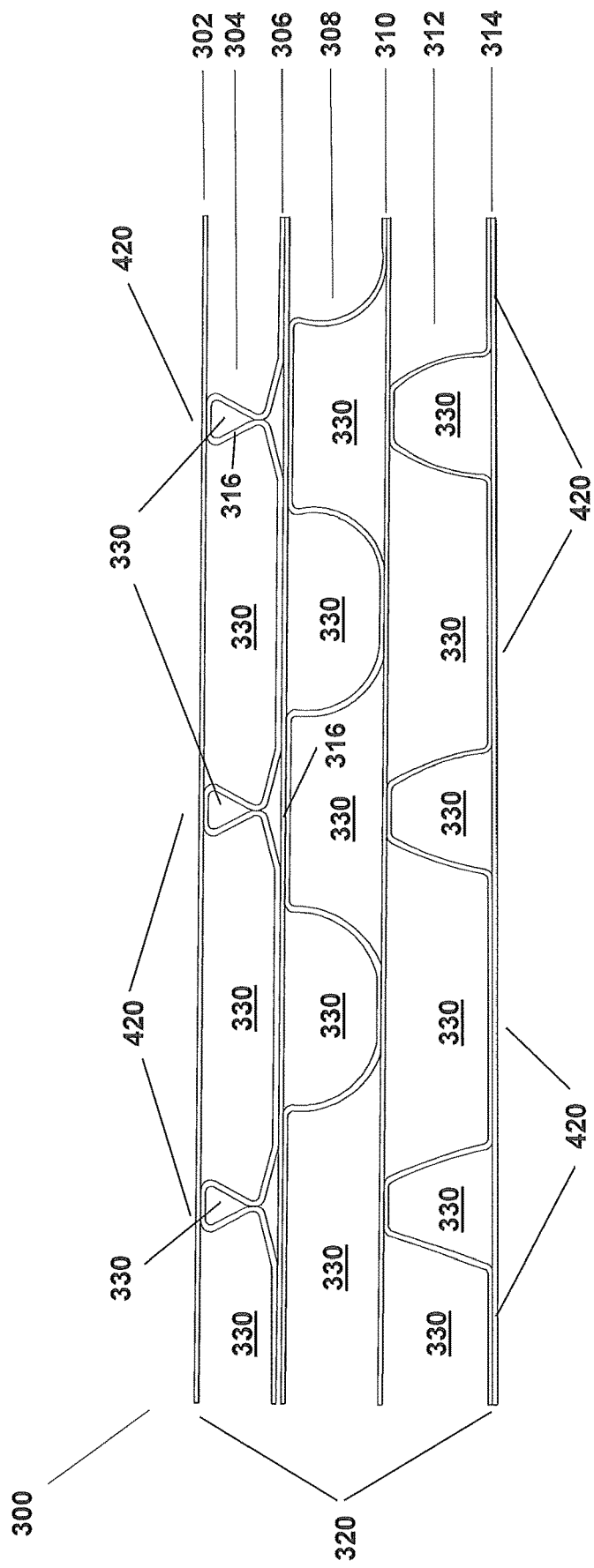

FIGS. 4A and 4B illustrate a cross section of layer 300 as, for example, shown in FIGS. 3A and 3B before and after a breach has occurred adjacent to layer 300. As shown in FIG. 4A, sheets 302, 306, 310, and 314 are flat sheets. Sheets 304, 308, and 312 are formed to provide cavities 330 between sheets. As shown in FIG. 4A, cavities 330 can have different shapes depending on location between sheets 320. Different cavities 330 are formed by the different the placement of sheets 304, 308, and 312. Orifices 316 allow for fluid flow between cavities 330. Sheets 320 can be lightly bonded together at some or all of their intersections, bond points 420, or bonding can be provided by frictional forces at bond points 420. Bonding can be accomplished with a layer of adhesive between sheets, numerous welding techniques (including vibration, ultrasonic, arc, spot, stir, and upset welds), or compressive preloading that forces mating sheet faces together to resist their relative shearing motion with friction or atomic (Johansen block) forces.

As shown in FIG. 4B, once a breach 221 has occurred adjacent to a portion of layer 300, sheets 320 may deform in response to the breach 221. Deformations may be in the form of lateral translations of each sheet 320, perpendicular "crushing" of each sheet 320, or other action. As shown in FIG. 4B, sheet 304 has buckled to collapse some of cavities 330 and further to seal holes 316. All sheets 302, 304, 306, 308, 310, 312, and 314 have translated slightly with respect to one another, sealing other holes 316. The compression of 308 and 312 is reduced compared to the buckling of layer 304 by the successive closure of holes 316 where fluid flow has been impeded. The crushing in successive sheets is reduced with distance from breach 221.

Sheets 320 that form layer 300 illustrated in FIGS. 3A, 3B, 3C, 4A, and 4B can be formed of solid materials with sufficient structural strength to resist the forces of impinging fluids in nominal and designed-exceptional operations. These forces are usually orders of magnitude smaller than the forces exerted by static and dynamic fluid pressure on the conventional structural and flow control components of containers. This allows sheets 320 to be relatively thin compared to the spatial extent of cavities 330. The overall thickness of layer 300 in some embodiments is not a substantial detriment to the volumetric performance of the containers (how much volume of fluid the container contains within its outer envelope) in which layer 300 is utilized.

Although static and dynamic pressures are identical in sheets 320 where they share exposure to the fluid with the container, the spatial scale of the features on sheets 320 is much smaller than the size of the container such as pipeline 100, exposing the features to much smaller differential pressure forces (as discussed above, the dimensions utilized in the figures are not to scale). Cavities 330 formed in layer 300 and the thickness of their surrounding sheets 320 have been exaggerated for illustration purposes.

The actual thickness of sheets 320 can be substantially smaller than the planar area extent of sheets 320. Sheets 320, then, can affordably be manufactured by roll-to-roll processes, such as impressing, embossing, thermal molding on rollers, photolithography, photochemical etching, masked chemical etching, electro-deposition, laser drilling, water jet cutting, and other low cost-per-feature processes.

Sheets 320 may be adhered to one another as part of their manufacture as shown by bond points 420 in FIGS. 4A and 4B. Adhesion can be provided by bonding or they can be clamped to one another by friction and compressive forces parallel to their thickness. Such forces are routinely available on the concave surfaces inside many containers, such as pipeline 100.

Sheets 320 are attached to one another in nominal operation. Greater flow impediments can be provided by occluding flow passageways when sheets 320 are allowed to move with respect to one another, for example during designed-exceptional operation such as a breach 221. Adhesion can be broken by designing bonding points 420 to be sufficient to maintain relative sheet feature alignment during nominal operation, and to fail during off-nominal operation. Friction forces are even easier to dispel during many kinds of transient accidents, such as the particular example illustrated in FIGS. 2A, 2B, and 2C, wherein radial compression is lost in the vicinity of breach 221. Some embodiments, however, do not require such deliberate inter-sheet misalignment in order to provide advantageous and safety-enhancing flow control.

Materials used to implement sheets 320 illustrated in FIGS. 3A and 3B can be nearly any solid. Mechanical strength in tension and shear is generally desirable for sheets 320 to perform a flow impeding function without occupying excessive volume. Mechanical toughness in these materials is desirable for layers 300 that are designed to deform. However high elongation performance, which is often heist in weaker plastics, is likely to be more desirable than strength or toughness for containers whose accidents anticipate extreme displacements of their conventional structural components (e.g. walls).

In some embodiments, sheets 320 can be formed of a tough material such as stainless steels (e.g. 316L) for pipelines and special silicones for dirigibles, but the actual best sheet materials are likely to be very specific to the fluids contained and their worst-case operating environments. Actual best materials to use in sheets 320 are likely to optimize economic advantages, which means that thermal insulators including open- and closed-cell foams could be favored for a container wherein heat transfer to the walls costs more, while the best thermal conductors (e.g. Al, Au, Cu, etc. in relatively large grained, nearly-pure alloys, which are also highly ductile) could be favored for a container wherein heat transfer to the wall costs less. Both of these opposite thermal desiderata are common in pressure vessels.

As discussed above, FIGS. 4A and 4B illustrate layer 300 as shown in FIGS. 3A and 3B in the vicinity that has erupted through a breach 221 in a wall 114, such as the illustration of FIG. 2 in the margin of the bulge 223 in inner layer 111. As shown, layer 300 is constrained against either a damaged outer wall, such as outer wall 110 illustrated in FIG. 2A, 110 or unconstrained against a blown out breach in the wall. The breach itself does not appear in FIG. 4, being either too wide, or the exterior wall being absent on the scale of this figure. The cross-section of FIG. 4A shows the structure of sheet 300 prior to breach. The cross section of FIG. 4B is shown after the structure has been bent and distorted by the substantial forces likely to accompany the most significant container failure modes. As shown in FIG. 4B, the structure of sheets 320 have partially collapsed in transient deformation. Slight relative tilting has occurred due to the spatially non-uniform collapse of compartments in sheets 304, 308, and 310. Each of sheets 302, 304, 306, 308, 310, 312 and 314 has also slid relative to its neighbor. These deformations and relative displacements are illustrated with greater regularity and precision than would actually occur due to materials variations, thickness non-uniformity, and three dimensional plastic flow geometries that are very hard to model exactly. In particular, the originally flat sheets 302, 306, 310, and 314 would likely deform slightly out of plane.

The deformed sequence of the sheets in FIG. 4B, may not be exact, even for the relatively uniform original sheet structure chosen to illustrate for reasons of clarity in FIG. 3, but it is qualitative correct. Differential pressure escaping through the collapsing flow passageways at orifices 316 crunches them in sequence from the outer surface inward, one plane of compartments after another, like a falling string of dominoes. As shown in FIG. 4B, for example, orifices 316 have been closed by the crushing action that occurred in sheet 304 and 306. The outermost plane, formed by sheet 304 between sheets 302 and 306, collapses first, sustaining all of the differential pressure between compartments and exterior at the beginning of the decompression transient, until a bit less than half of its pressure has dropped and the controlling orifice moves inward to the next plane. Innermost planes experience least pressure differential, and collapse less and last. Collapsing planes can form dynamic seals by relative impingement of deformed sheets, and by the relative transverse sliding motion of adjacent (unbounded or broken-free weakly-bonded) sheets 320 that misalign their fluid passageways between sheets 320. In some embodiments, the transient seals are capable of almost total flow impediment (blockage) by successively closing orifices 316.

Some embodiments of the present invention can include inhomogeneous and even random separation of planar elements, as well as ordered, identical, uniquely different, and random spacing of the fluid interconnection paths (known as ventilation in some applications) made possible by holes or unbonded regions between the planar elements. Static seals that separate chambers as long as they remain intact can be utilized. Further, dynamic seals which restrict how much flow can occur during a specified interval can be included. Dynamic seals or partial seals formed by compressive contact between adjacent sheets 320 are sufficient to restrict fluid flow to insignificance over time scales of normal operations.

Figure 5A:
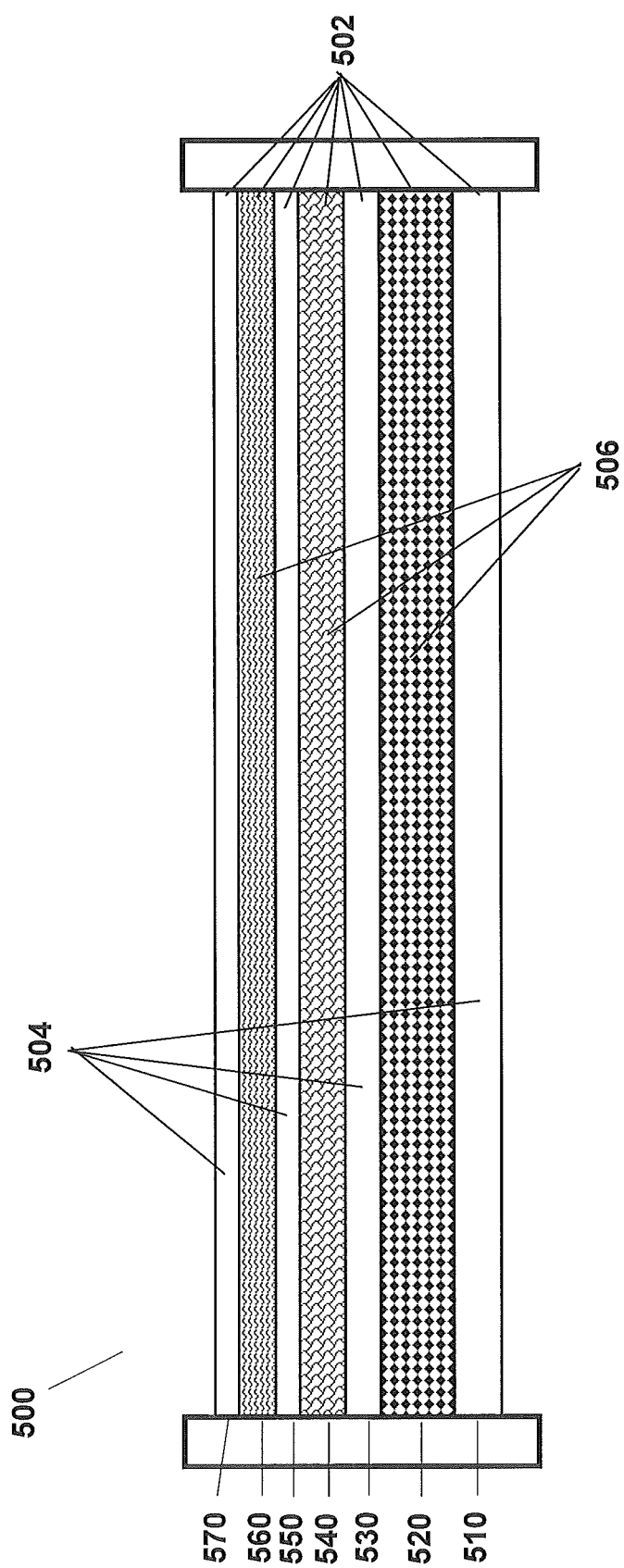
FIGS. 5A, 5B, 5C, 5D, and 5E illustrate a non-periodic multi-sheet structure according to some embodiments of the present invention.

FIG. 5A illustrates another layer 500 according to some embodiments of the present invention. Layer 500, which is a multi-sheet structure, may also be utilized to impede flow, for example as all or the innermost portion of inner layer 111 in FIGS. 1A and 1B. In some embodiments, layer 500 may be utilized by itself adjacent to the walls or throughout the volume of any container to control fluid flow through a container and to alter the thermal equilibration between fluid and wall. Multiple sheets 502, of which sheets 510, 520, 530, 540, 550, 560, and 570 are shown, are stacked to form layer 500. Sheets 502 are held together either by compressive forces perpendicular to sheets 502, adhesive bonds along the lines where sheets 502 come into contact, or a combination of compression and adhesion. In general, layer 500 can include any number and arrangement of sheets 502.

Layer 500 is assembled from an alternating pattern of multiple different kinds of flow impeding sheets 502. In FIG. 5A, two kinds of sheets 502 are shown: planar sheets 504 (e.g., sheets 510, 530, 550, and 570) and cavity forming sheets 506 (e.g., sheets 520, 540, and 560). In some embodiments, each kind of sheet 502 forms a sub-layer of graduated thickness. Some embodiments can also be constructed where each type of sheet 502 has substantially the same thickness.

Planar sheets 504 are nearly planar and porous sheets of a single material, impeding flow perpendicular to their lateral extents with porosity, permeability, or a pattern of very fine holes considerably smaller in diameter than their thickness. Planar sheets 504 can also be composed of viscoelastic materials that behave as reversibly compressible solids in nominal operations but are capable of maintaining transient seals with cavity forming sheets 506. Alternatively, planar sheets 504 can each or any one be constructed according to sheets 320 described as forming layer 300.

Figure 5B:
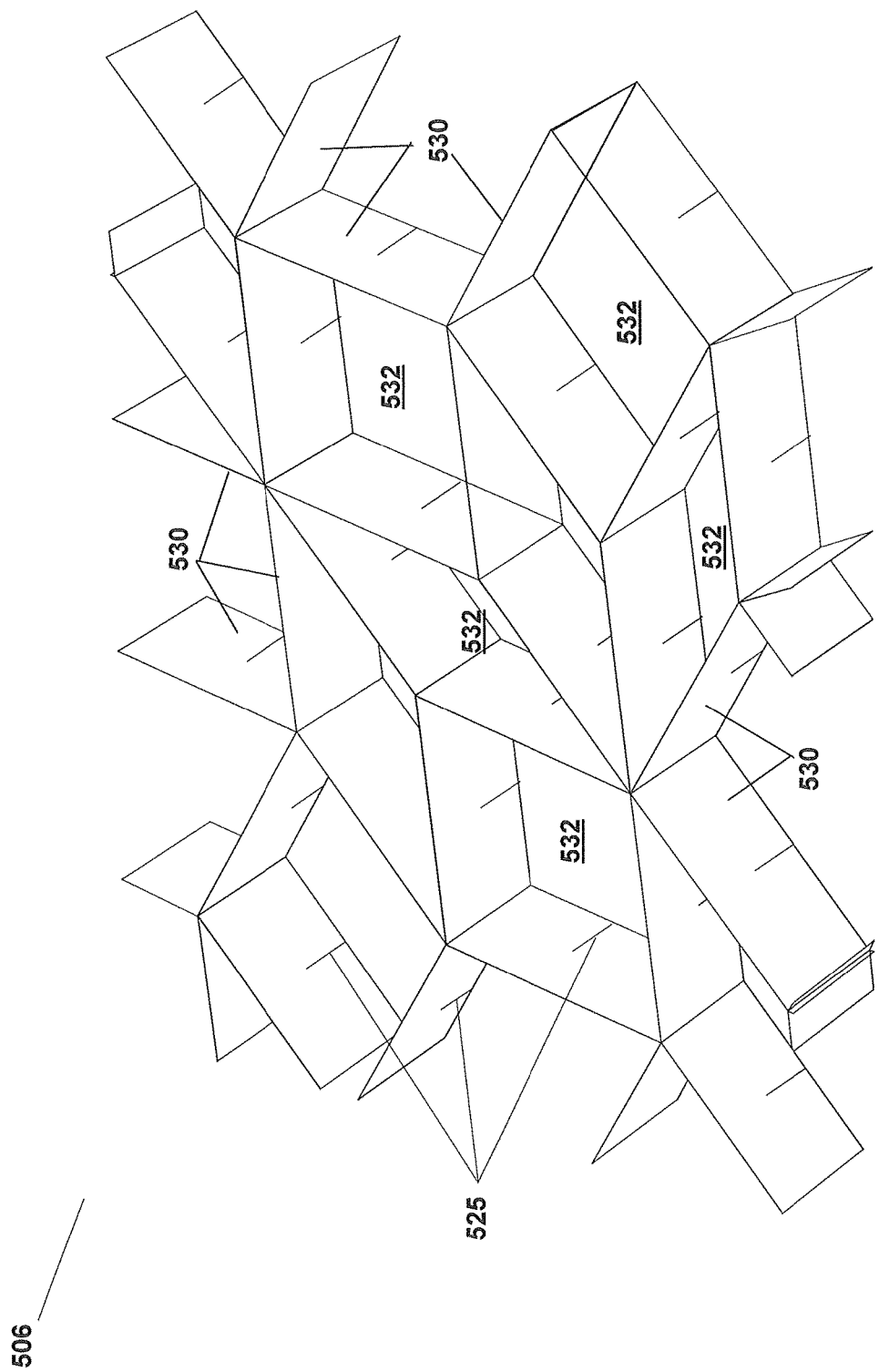
Figure 5C:
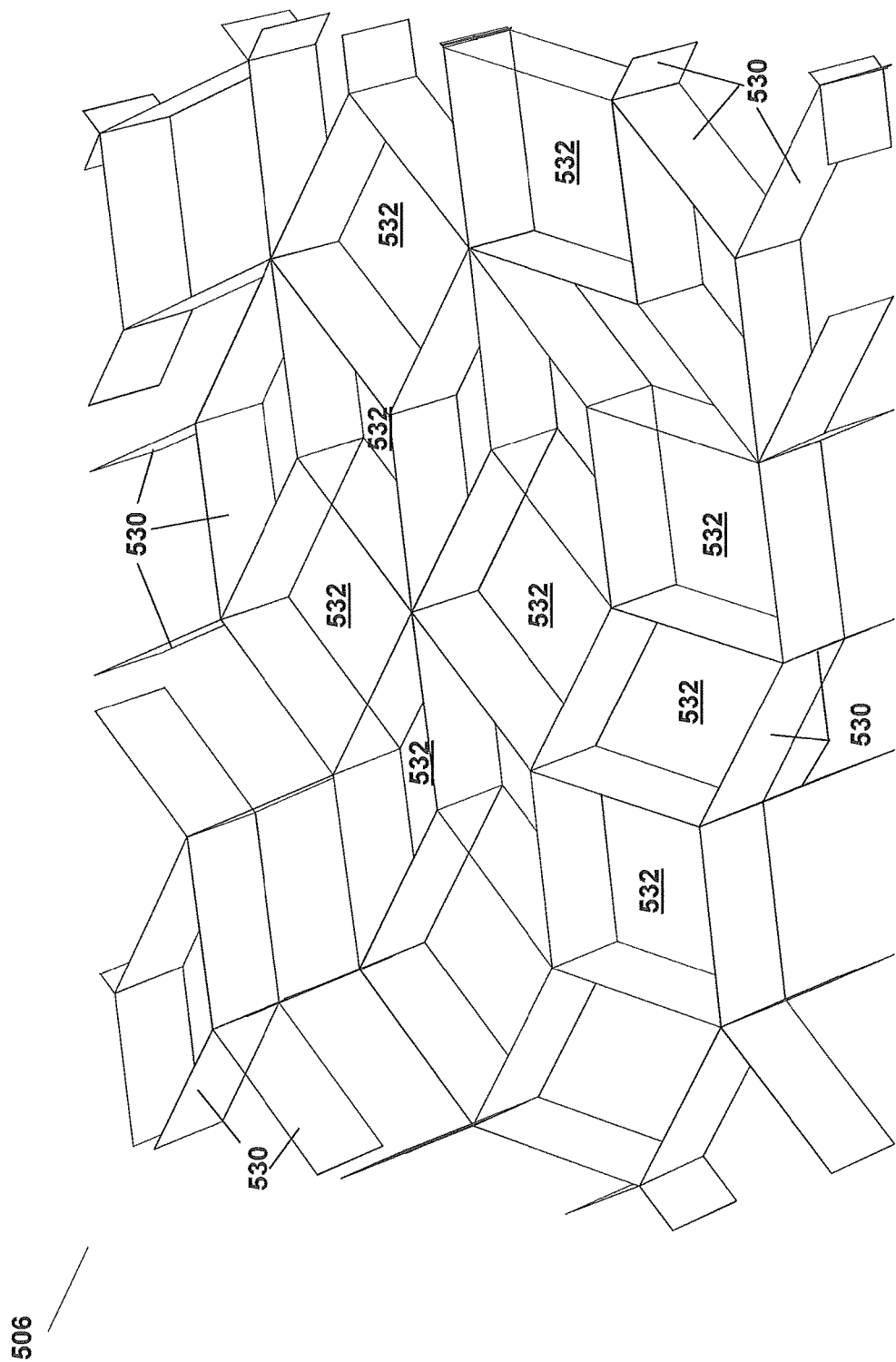
Figure 5D:
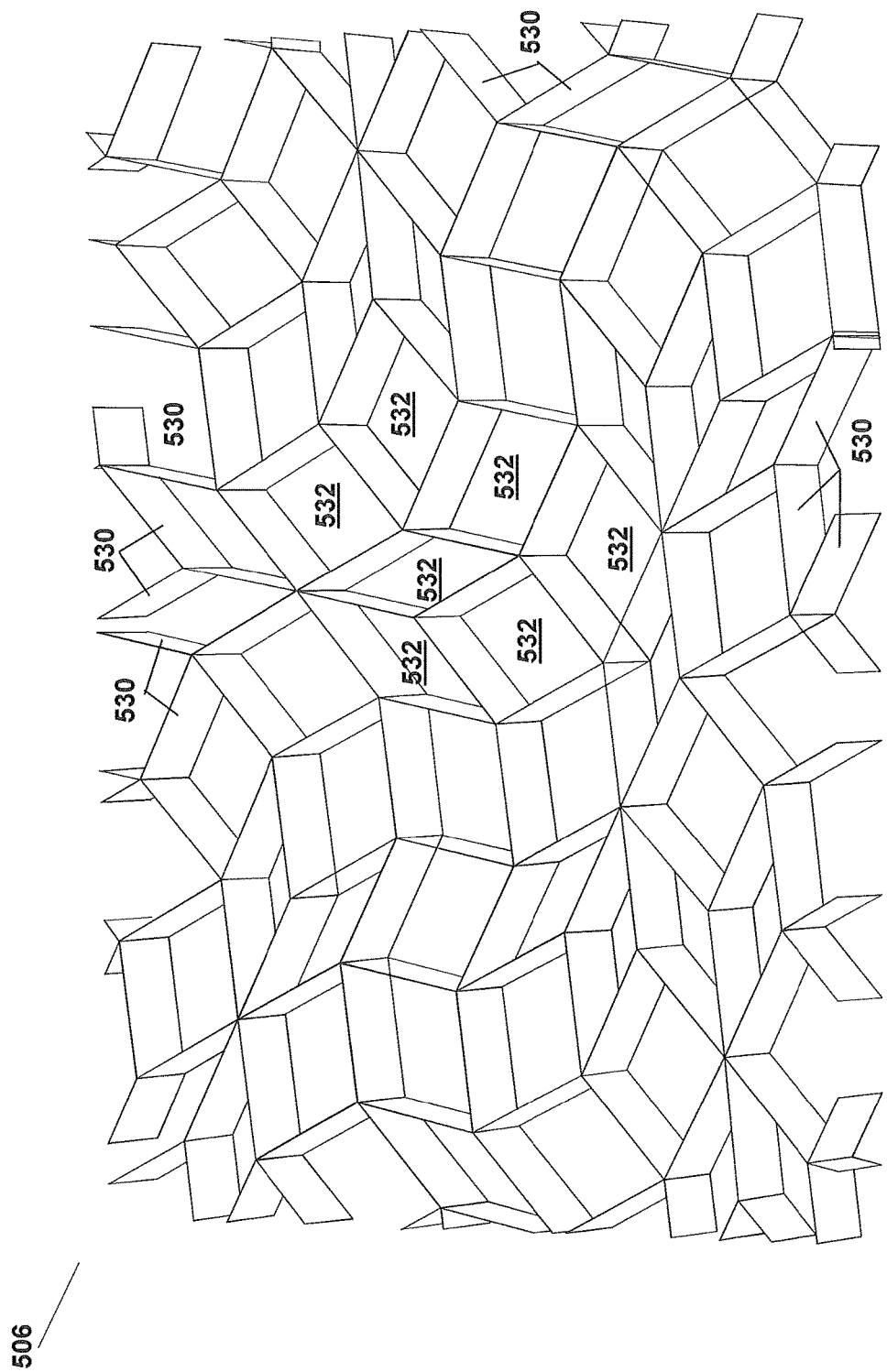

As shown in FIG. 5A, cavity forming sheets 506 alternate with planer sheets 504, and are composed of much thinner sheets arranged nearly perpendicular to the surface of sheets 506 to form cavities. FIGS. 5B, 5C, and 5D illustrate examples of cavity forming sheets 506. In some embodiments, cavity forming sheets 506 have decreasing thickness in their sequence the container wall is approached. For example, as shown in FIG. 5A, sheet 520 is thicker than sheet 560. Further, because of the decreasing thicknesses, cavities formed in cavity forming sheets 504 have increasingly finer cavities as the wall is approached.

Layer 500 may include any number of repetitions of individual sheets 502. The multiplicity of sheets is illustrated with a low number of sheets in FIG. 5A, and their periodicity is illustrated large enough perpendicular to the lateral extents of the sheets to provide clarity. However, more layers and finer perpendicular layer spacing can substantially increase flow impediment, while as few as two layers and perpendicular periodicity as large as roughly 50% of the dimensions of a container within which layer 500 is utilized can still provide flow impediment. Further, although FIG. 5A illustrates an example where sheets are geometrically similar to their next-to-nearest neighbor of the same kind, each of the sheets can be different in order to optimize a performance parameter of layer 500.

A gradient of non-uniformity in the thickness of sheets 120 is illustrated in FIG. 5A as one possible design approach for embodiments of layer 500 that might best seal penetrations of a variety of sizes. Both planar sheet 504 thickness and cavities in cavity layers 506 can be scaled logarithmically from sheet 520 to 540, for example with a factor of two decrease in dimensions between layer 520 and 540. Such deliberate thickness non-uniformity is likely to be particularly valuable in pipelines 100 (shown in FIGS. 1A and 1B), since core flow restrictions are economically disadvantageous throughout most of their interior and the transient flow impeding effect of more sheets would result in less flow impediment in core 115.

FIGS. 5B, 5C, and 5D illustrate examples of cavity forming sheets 506. As shown in FIG. 5B, sheet 506 is formed of intersecting vertical walls 530. Intersecting vertical walls 530 form cavities 532. As illustrated in FIG. 5B, cavities 532 may all have different shapes and sizes, depending on the particular geometry of intersecting vertical walls 530.

Sheets 506 illustrated in FIGS. 5B, 5C, and 5D form a pattern of cavities whose plan is called Penrose tiling. This pattern is mathematically guaranteed not to repeat over any period in any direction, and so may avoid a category of local compressive instabilities (that occur at reduced compressive stress) known as sub-area buckling. Other cavity geometries that periodically tile the plane of cavity forming sheets 506, including triangles, rectangles, trapezoids in different orientations, as well as fully random tilings, are other variants of the structures that can be utilized. Cavities can be laterally coupled with holes, or with slots 525 as shown in FIG. 5B. In some embodiments, sheet 506 need not rely on any in-plane flow passages either for nominal flow or impeded flow.

FIGS. 5C and 5D illustrate other example patterns of sheets 506. As illustrated in FIG. 5A, cavities 532 can be enclosed on all sides once sheet 506 is positioned between two of planar sheets 504. Additionally, in some embodiments, flow into cavities 532 can be affected at the intersection between planar sheets 504 and sheet 506.

Figure 5E:
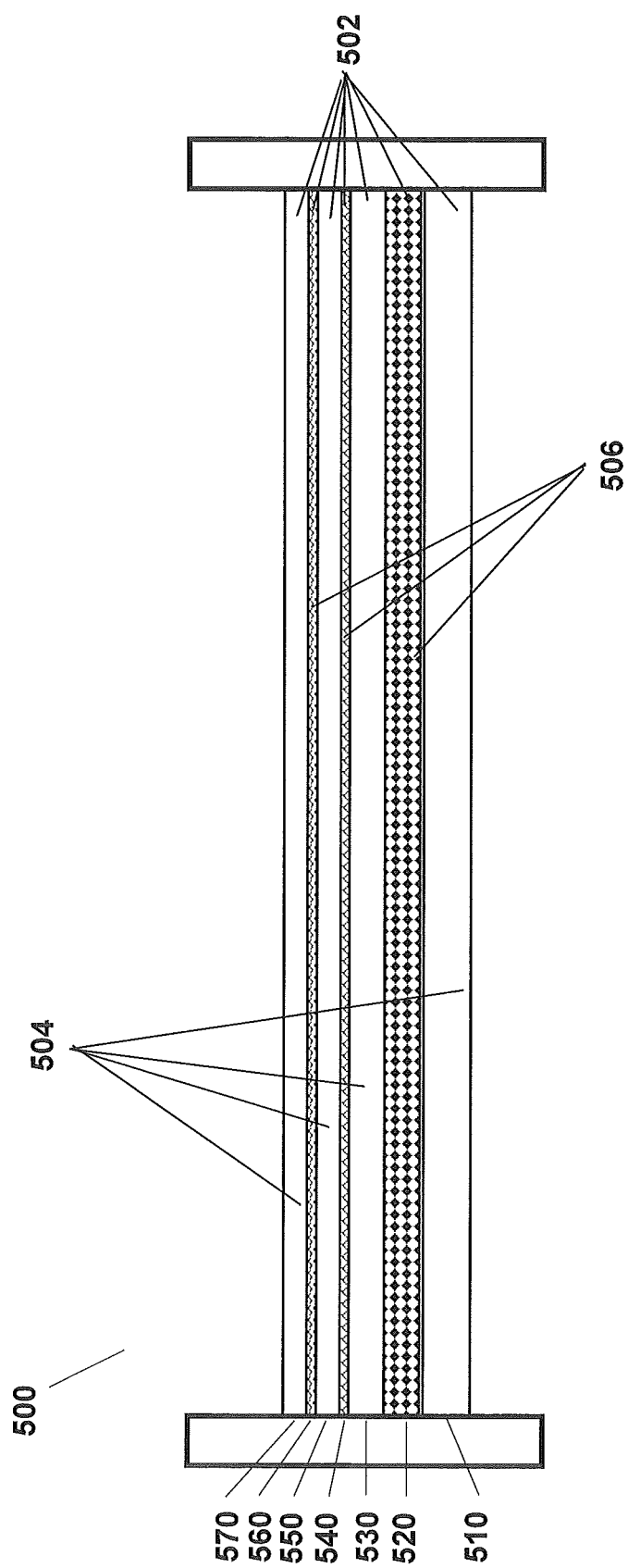

Sheets 506, e.g. sheets 520, 540, and 560, can be designed to buckle at a precise compressive stress, such as would occur through layer 500 in the event of container depressurization. FIG. 5E illustrates layer 500 depicted in FIG. 5A in the immediate aftermath of a container penetration, wall crack, or rupture occurring in the wall section immediately above the illustrated section of cut out sheets 510, 520, 530, 540, 550, 560 and 570. Buckling of sub-layers 520, 540, and 560 have formed dynamic seals between the crumpled cavity forming sheets 560, 540, and 520 against the surfaces of planar sheets 510, 530, 550, and 570, impeding flow towards and through the damaged region. Layer 500 and similar embodiments can be particularly effective in restricting accidental flows through the wall of pressurized containers, where large transient pressure differences are available to form transient seals.

FIG. 6 illustrates another sheet structure layer 600 according to some embodiments of the present invention. Sheet structure layer 600 may also be utilized to impede flow, for example as all or the innermost portion of inner layer 111 in FIGS. 1A and 1B. In some embodiments, layer 600 may be utilized by itself adjacent to the walls or throughout the volume of any container to control fluid flow through a container and to alter the thermal equilibration between fluid and wall. FIG. 6 illustrates a series of cut out portions of flow impeding sheets 602 in three dimensions. Sheets 602 can be single-planar sheets with no structure perpendicular to the surface area of the sheet (parallel to its thickness) that would prevent sheet 602 from bending.

Multiple textured sheets 602 are strongly attached to the container's structural wall or to a backing strip 604, which itself can be attached to a wall or other structure support within a container. In some embodiments, backing strip 604 can be comparable to sheets 602 in thickness, while the wall itself could be an order of magnitude thicker. In comparison to the relatively immobile sheets 320 illustrated in FIGS. 3A and 3B, sheets 602 of FIG. 6 are much less parallel to the wall they are attached to, and remain attached to even in penetration accidents. Flow between sheets 602 is relatively unimpeded in nominal operation, where fluid may flow along the face of sheets 602, but sheets 602 can fold or flex to block flow through medium sized breaches in wall (not shown) in case of puncture or rupture. The breaches they seal can be cracks underneath the backing strip or penetrations smaller than a sheet length extending beyond the wall or penetrations next to the side of the last sheet illustrated or cracks running under portions of the entire series of sheets.

Portions of sheets 602 may be bonded to fasten or seal at some locations 604, while remaining free to slide or deflect at other locations 606. Sheets 602 can be entirely cantilevered from wall or backing strip, and so have no need for penetrating holes to connect the fluid volumes (cavities) on either side of their faces. Sheets 602, because of the relatively large surface area exposed to the fluid, can supply considerable heat transfer between fluid and a wall or other structure to which they are attached in an operating configuration. Sheets 602 can then stack up to plug a breach even if portions of some of sheets 602 are damaged.

Figure 7:
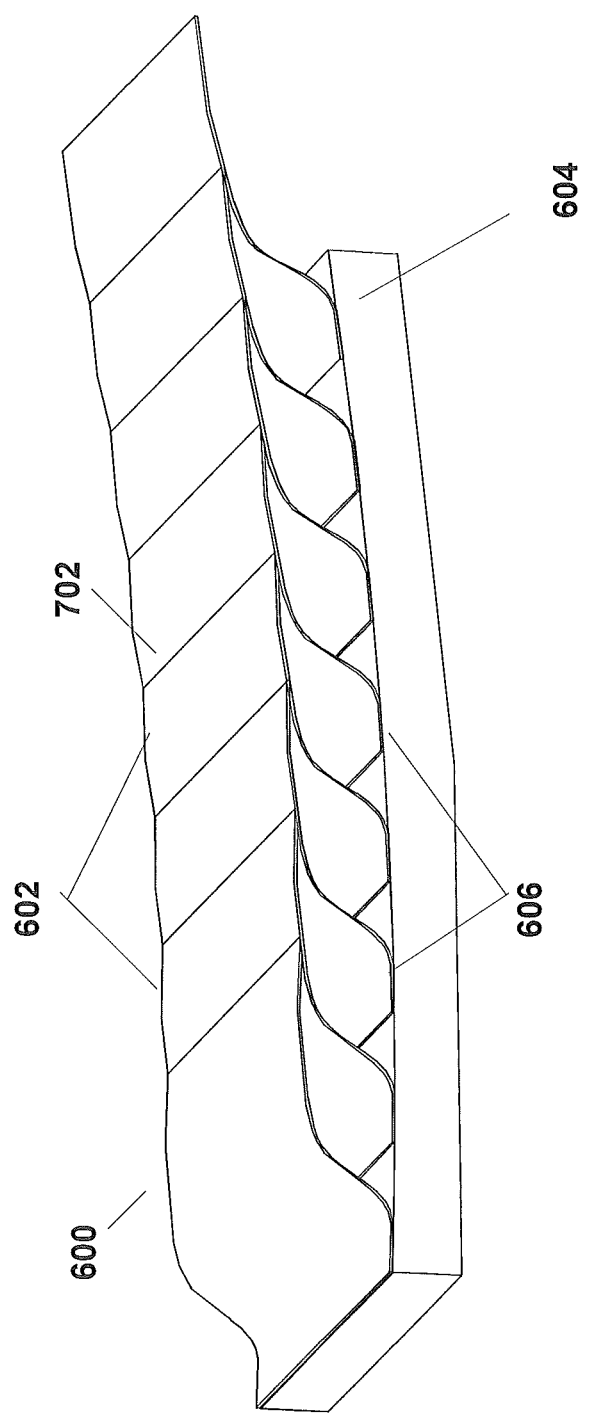
FIG. 7 illustrates the multiple sheet structure of FIG. 6 in the immediate aftermath of a container breach.

FIG. 7 illustrates sheets 602 depicted in FIG. 6 in the immediate aftermath of a container penetration, wall crack, or rupture immediately adjacent to the wall section behind the cantilevered wall mount of the same series of sheets 600. Elastic and/or plastic deformation of sheets 602 have formed dynamic seals 702, impeding flow towards and through the damaged region. As shown in FIG. 7, seal 702 can be formed by the action of multiple ones of sheets 602 laying against one another. Sheets 602 can be particularly effective in pressurized containers, where large fluid dynamic flows and pressure differences are available to form transient seals. For example, sheet structure 600 can effectively impede flow from bullet penetration, wherein the bullet (or small piece of shrapnel) forms a hole in the wall which is smaller than the inter-sheet periodicity, because adjacent sheets 602 are bent to bridge the hole. Sheet structure 600 is anticipated to be particularly effective against penetration by fork lift blades, "ditch witch" teeth, or other such devices because sheets 602 will be jammed against a large penetrator to massive to be blown out of the hole it has punctured in the container wall 604.

Figure 8A:
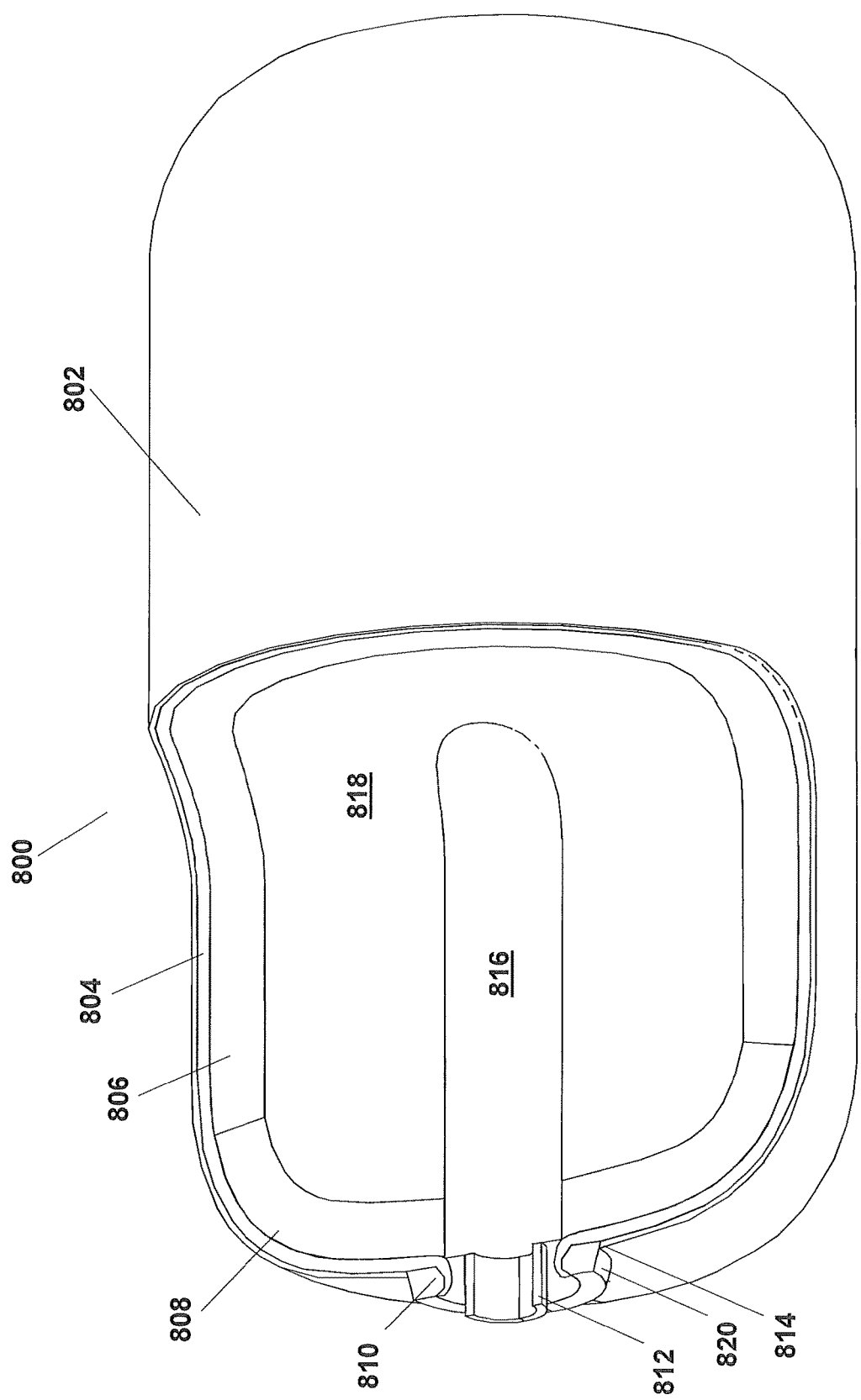
FIGS. 8A, 8B, 8C, and 8D illustrate a lined and coated pressurized containment vessel according to some embodiments of the present invention.

FIG. 8A shows a cut away of an example pressure vessel container 800 that can include one or more embodiments of the present invention. In particular, FIG. 8A illustrates a lined and coated pressure vessel, container 800, which can use multiple sheet structure layers according to some embodiments of the present invention. Container 800 includes a static pressure shell 802. Pressure shell 802 is coated with conventional insulating and puncture-resistant layers (too thin to be shown and merged with the shell exterior during manufacture), while permeation through and into conventional layers 802 is prevented by a liner layer 804. Container 800 also includes layers 806 and 808 according to some embodiments of the present invention. Layers 806 and 808 can be one of layers 300, 500, or 600 illustrated in FIG. 3A, 5A, or 6 above. As shown in FIG. 8A, layers 806 and 808 are located along the interior of shell wall 802, within liner 804. Sheet structures in layers 806 and 808 can be similar to layer 300 depicted in FIG. 1, layer 500 depicted in FIG. 5, or layer 600 depicted in FIG. 6, or combinations thereof. Embodiments in layers 806 and 808 may not be similar, since their textures can have different orientations and periodicities, and the wall they are affixed to has different curvature in one or both directions perpendicular to sheet thickness, depending on position within container 800. Additionally, in some embodiments layers 806 and 808 can utilize materials that provide insulation and may themselves be puncture resistant.

Container 800 can be open at one end to allow for the flow of entering and egressing fluids through different ports through a boss 810. Actual plumbing connections that provide for nominal flow into or out of container 800 can be made through one or more pipes 812 through the exterior face of boss 810. Exception flows can be controlled with conventional components (e.g. pressure relief devices or burst features conventionally called burst 'diaphragms') in the event of excessive container interior pressure or temperature, as well as in the event of excessive mechanical loads applied to pipes 812 or to the mountings of shell 802 or to the entire container 800 through shock or acceleration. The radial exterior margin 814 of boss 810 is often the most advantageous location for such off-nominal flow mitigations components and may include pressure relief devices or burst diagrams. In some embodiments, such devices at radial exterior margin 814 are planar and designed to split open at a particular stress. As such, exterior margin 814 is a seal that is generally too thin to be visualized on the scale of FIG. 8.

The two directions of fluid interface flow can be separated by an internal laminated phase segregation geometry 816. The internal volume of container 800 is shown as region 818, and is conventionally filled with only fluid. Some embodiments can impede flow in internal volume 818, utilizing one or more possibly different laminated sheet geometries in different regions. The outer surface of boss 810 facing the ambient can have a pressure relief flow path locally protected by another different multi-sheet structure embodiment 820 on its exterior.

Figure 8B:
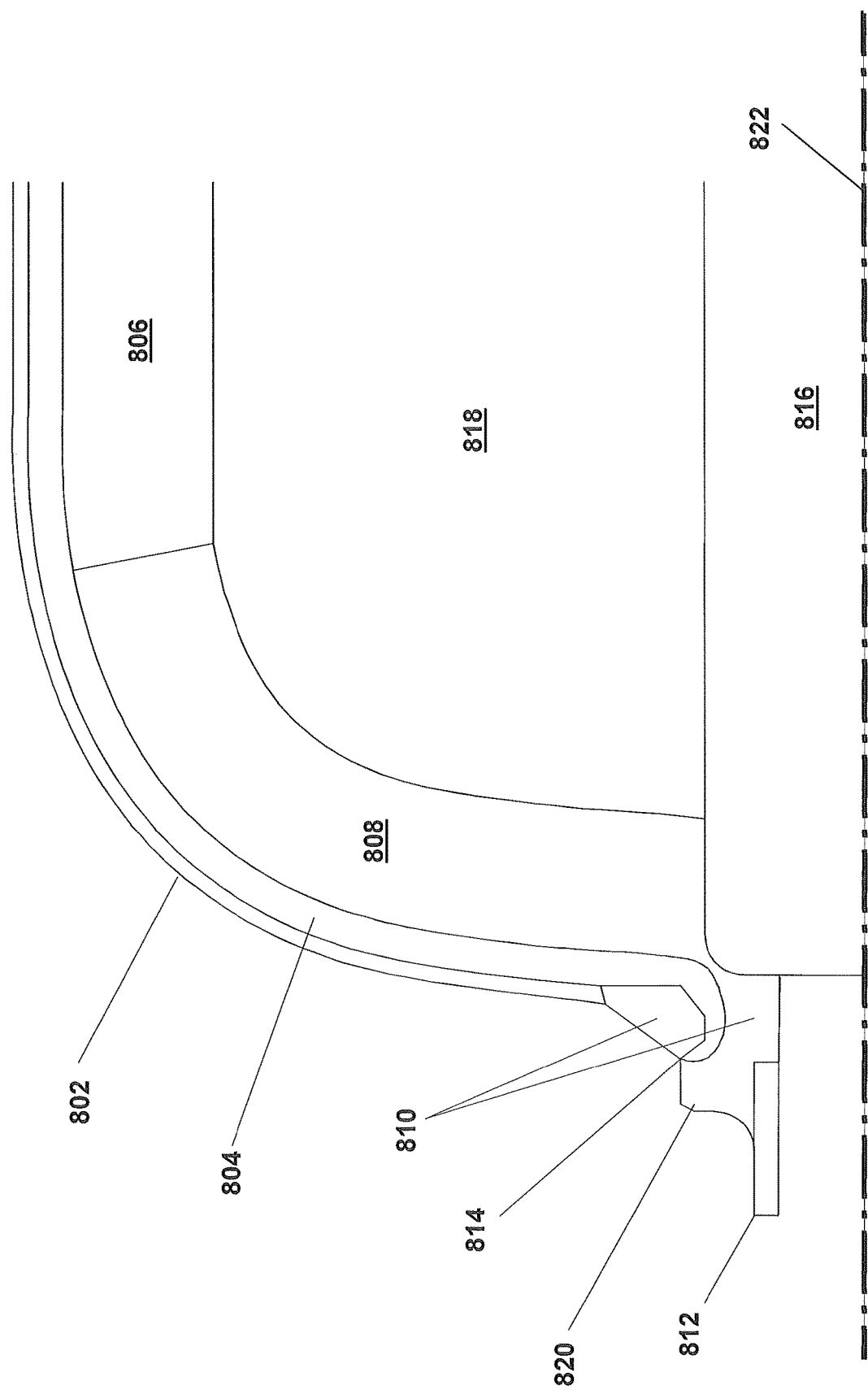

FIG. 8B illustrates a cross section of container 800 as shown in FIG. 8A and illustrates an expansion of the end dome region to show details in the vicinity of boss 810. As such, FIG. 8B illustrates the upper quadrant of a cross section of container 800. The axis of symmetry of container 800 is illustrated as line 822. Other common pressurized fluid containers are also axi-symmetric, but have slightly different boss geometries on either ends, and many of these have no pipes on one end. As illustrated in FIGS. 8A and 8B, layers 806, 808 according to embodiments of the present invention are located within container 800. Layers 806 and 808 are illustrated to be within and in contact with liner 804. Layers 806 and 808 may be the same multi-sheet structure, or may be different to better handle the difference in surface geometry of outer shell 802 of container 800. Segregation geometry 816 may be formed of multi-sheet layers according to some embodiments of the present invention. Further, fluid flow within internal volume 818 may be restricted utilizing multi-sheet layers according to some embodiments of the present invention. Additionally, layer 820, which may be a multi-sheet layer according to some embodiments of the present invention, may be formed around boss 810 external to container 800.

Containers 800 designed to withstand nominal and off-nominal operations containing pressurized fluids generally provide for interfaces that capture liner 804 inside shell 802 and restrain components against very large pressure forces that push boss 810 against shell 802. In some examples of container 800, exterior margin 814 provides a narrow potential flow path for off-nominal fluid release at the margin of boss 810.

Figure 8C:
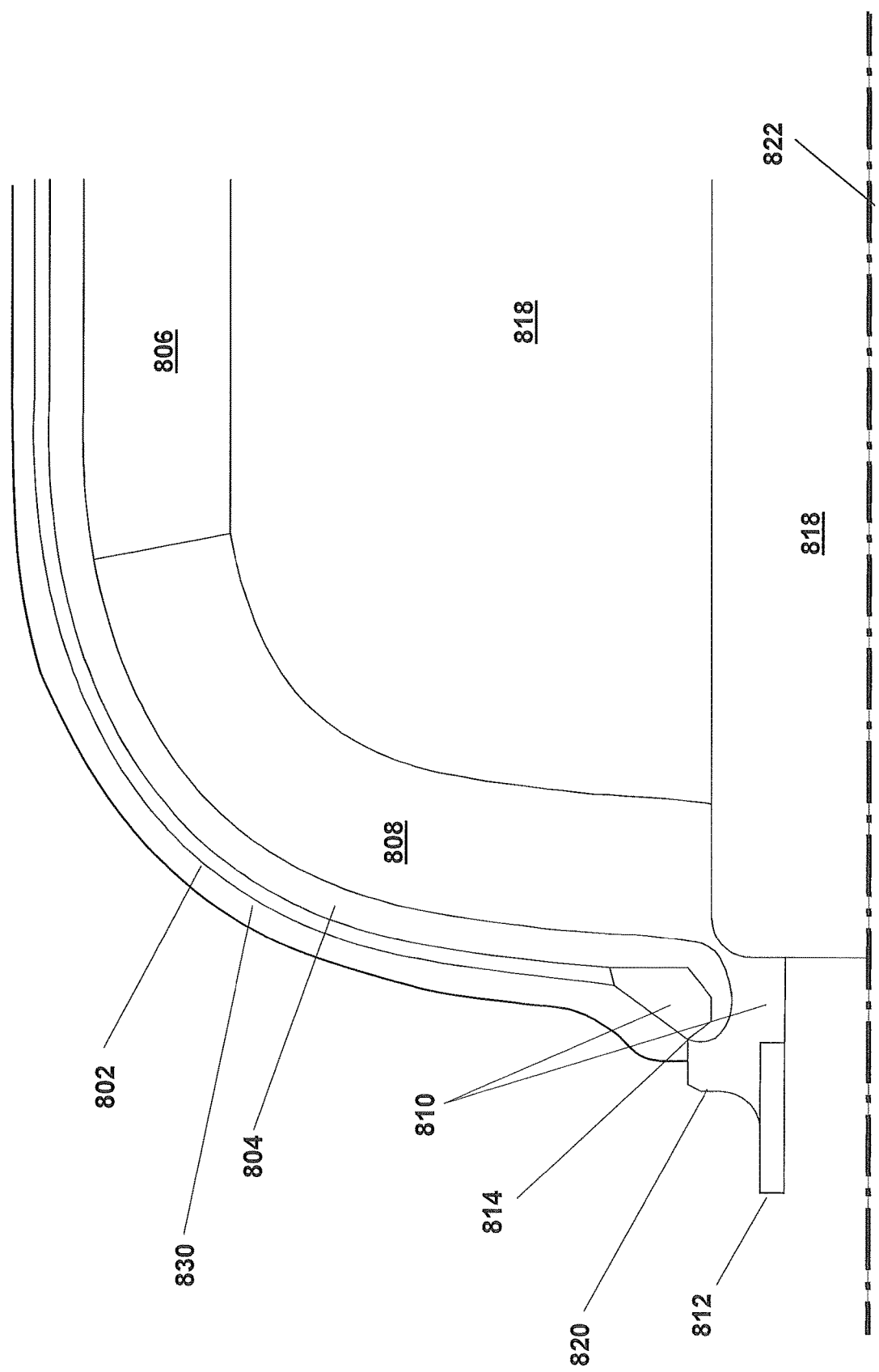

FIG. 8C illustrates the same cross section of container 800 that is shown in FIG. 8B, except that an exterior layer 830 embodying multiple sheets. Layer 830 can be, for example, similar to layer 300 or layer 500 discussed above. Layer 830 may be protective against shrapnel or the impingement of exterior fluids that might otherwise damage insulation or bullet proof coatings on shell 802, or might damage the shell itself. Layer 830 may also provide thermal equilibration enhancement features, especially if layer 830 is an example such as layer 500. In some embodiments, layer 830 can also provide protection against external fire risk, and thereby help mitigate chain reaction disasters that may occur where several containers such as container 800 are in proximity to one another.

Figure 8D:
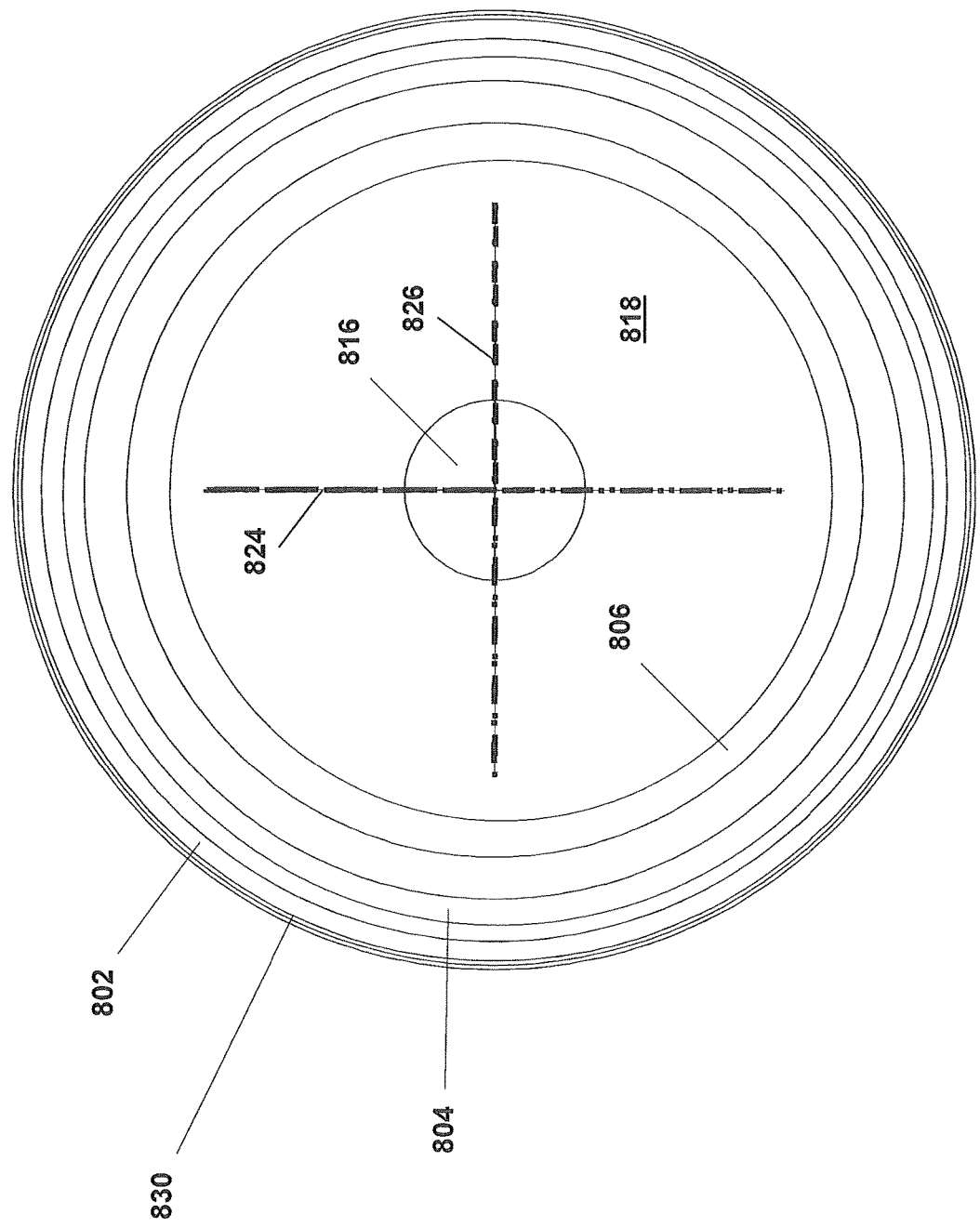

FIG. 8D provides the locations of the same components shown in FIGS. 8A and 8B viewed in a cross section of container 800 that is perpendicular to the cross section illustrated in FIG. 8B (i.e., axis lines 824 and 826 are perpendicular to axis line 822 illustrated in FIG. 8B). Boss 810 does not appear in this section, which includes the axis of rotational symmetry in most common pressurized fluid containers as the crossed axis lines 824 and 826. As illustrated in FIG. 8D, container 800 may include external protection layer 830, which appears as an outer annulus around outer shell 802. Inside of outer shell 802, there may be one or more liner layers 804. Inside of liner layer 804 is at least one layer according to the present invention, of which layer 806 is illustrated. The cross section of container 800 illustrated in FIG. 8D indicates layers as concentric circles, indicating that container 800 is roughly cylindrical in shape. From FIGS. 8A and 8B, the ends of container 800 may be rounded. However, container 800 may have any cross section and may be of any shape.

FIGS. 9A, 9B, 9C, and 9D show bubble diagrams that schematically illustrate construction of a container 900 wherein various layers combine to mitigate different hazards. A variety of possible regions within and surrounding a container are illustrated with their spatial extents simplified to ellipses. These ellipses represent the possible interfaces between regions. Mechanical loads are transferred across those interfaces. Regions that contains fluids, such as the interior contents 902 of container 900, are represented with the same generic shapes as solid components, and entire subsystems of components that may contain fluids as well as solids in some situations.

Shapes that have an open boundary indicate that there is no material barrier that could define an interface between regions on either side of that opening. Chief among these are the surrounding ambient environment 904, which has no specifiable boundary except with the extent of container 900, and the various possible embodiments of layer 906 of multi-sheet structures (e.g. layers 300, 500, or 700 detailed above) which may be open to fluid contents 902 or ambient environment 904.

Other regions illustrated in FIGS. 9A, 9B, 9C, and 9D are deliberately connected with fluid flow paths 908 and 910, which as described above can be any combination of plumbing components. Plumbing into and out of the container 900, illustrated as flow paths 908, as well as one or more deliberate fluid release paths, illustrated as flow path 910, to the ambient environment 904 are illustrated. A wide variety of container plumbing components can render the release of fluids, whether deliberate, designed off-nominal operations, or accidental, much safer, and are schematically shown as a safe exhaust subsystem 912.

Figure 9A:
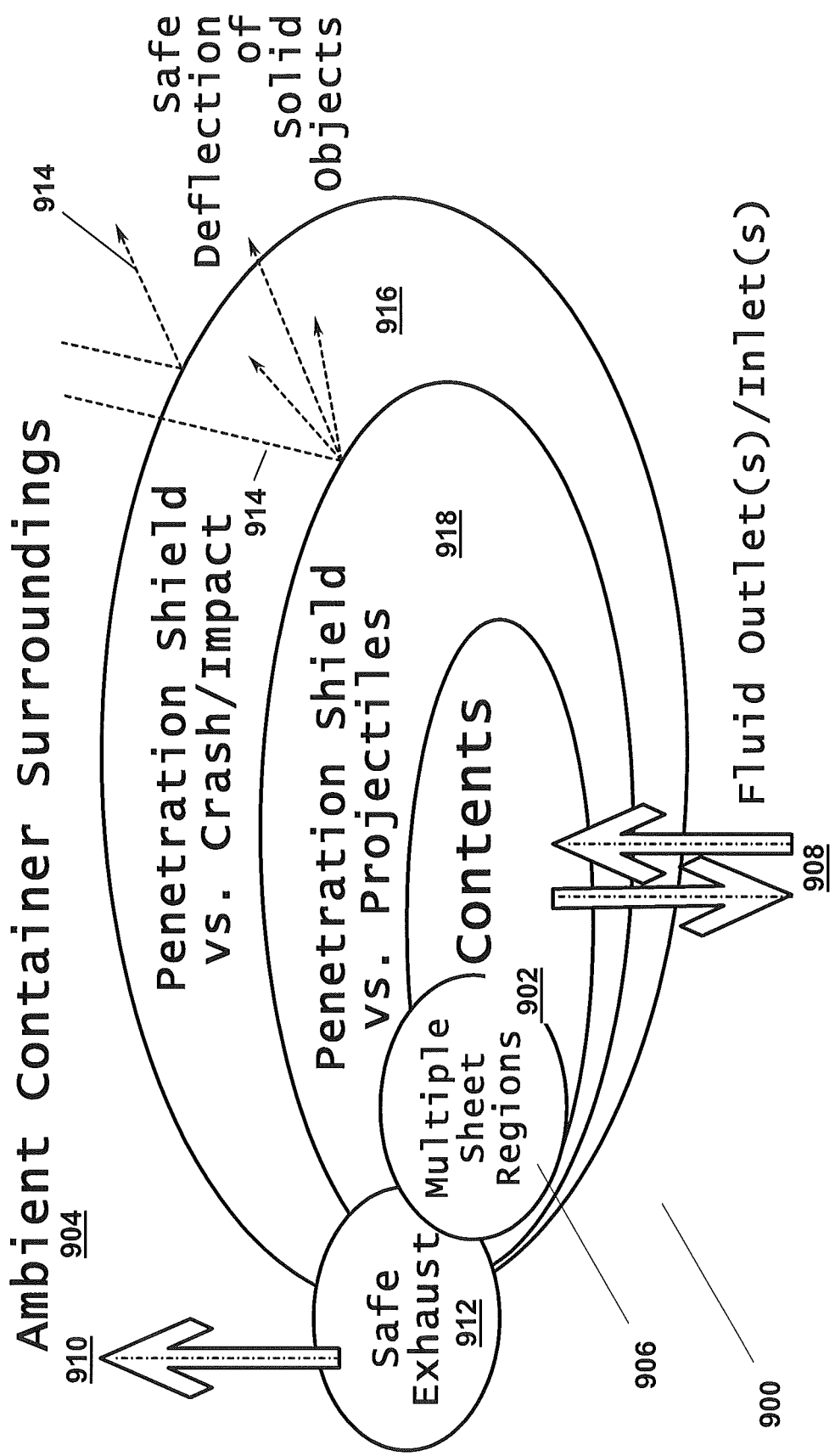
FIGS. 9A, 9B, 9C, and 9D illustrate schematic bubble diagrams of multiple flow impeding embodiments of a container.

As shown in FIG. 9A, a container 900 may include multiple sheet region 906 between contents 902 and ambient surroundings 904. As discussed above, multiple sheet region 906 may include any number of layers of multi-sheet structures, and may include other structures such as liners as well. A safe exhaust system 912 is coupled with multiple sheet region 906 to allow for controlled release of fluid 902 to ambient 904 as discussed above. In addition, container 900 may include penetration shield regions 916 and 918. Penetration shield regions 916 and 918 can be utilized to protect against crash or projectile damage, respectively.

Potential impact or penetration paths 914, illustrated with single dotted lines, represent some of the varied trajectories of solid masses, some of which might be entrained in fluid or carry fluid with them, around or through container 900. Significant hazards beyond those of direct container penetration can accompany any chemical incompatibility with contents 902. In FIG. 9A projectile paths 914 indicate schematic paths that accidental fragments, particles, artifacts, and even vehicles might take, and how those paths 914 might be altered by solid components of container 900. The acute angle in penetration paths 914 have been placed in regions where such objects can have their paths 914 altered to improve safety.

Outer penetration shield 916, which can surround container 900, does its best to prevent the incursion of large objects, which might otherwise breach container 900. Outer penetration shield 916 can include crash barriers, chain link fence, barred openings, grilles, and many other shields, some of which are proven methods to make gross penetrations of container 900 much less likely. Outer shield 916 may be bridged by any safe exhaust subsystem 912. Within outer penetration shield 916, if any, inner penetration shield 918 can be protected by the outer shield 916 from gross incursions, while deflecting smaller and generally more energetic threatening solid objects (e.g. bullets and shrapnel). In some embodiments, inner penetration shield 918 can be a multi-sheet structure such as layers 300, 500, and 600 (shown in FIGS. 3, 5, and 6, respectively), which can be utilized to deflect shrapnel (as a ballistically flowing 'fluid').

The bubble diagrams shown in FIGS. 9A, 9B, 9C, and 9D localize embodiments of multiple sheet structures 906 to particular interfaces between container components. Such localizations are expressed schematically in FIGS. 9A, 9B, 9C, and 9D. In that case, the shape of the regions is not indicative of the physical geometric shape of the various structures depicted, and are therefore generally illustrated as ellipses. The generalized schematics can express, in any of the variety of containers, the risks that a container faces and the layers of protection that can mitigate that risk. Even more fundamentally, in many accidents interfaces between solid components can be nonexistent before the event (e.g. a location of a future crack within some component). A geometric localization after an accident is often statistical or irrelevant (e.g. somewhere in the contained fluid or buried among a heap of debris) to responding to the event.

Besides offering better generality, bubbles representing regions illustrate various examples of structures, including multi-sheet regions, without complicating the illustration. FIGS. 9A, 9B, 9C, and 9D drill down hierarchically through 13 distinct regions. FIG. 9A shows 6 distinct regions: the multiple sheet region 906 (which might contain one or more multi-sheet layers), safe exhaust subsystem 912, impact penetration shield 918, projectile penetration shield 916, and contents 902, inside the surrounding ambient 904. These six regions can have 15 separate interfaces (the number of ways two regions could be chosen from among 6), but in FIG. 9A four (4) of these interfaces are explicitly missing. The illustration of FIG. 9A show that the localization of multiple sheet regions 906 does not interface with impact shield 916, nor do the contents 902 interface with impact shield 916, safe exhaust subsystem 912 or ambient 902, except through intermediate components.

Figure 9B:
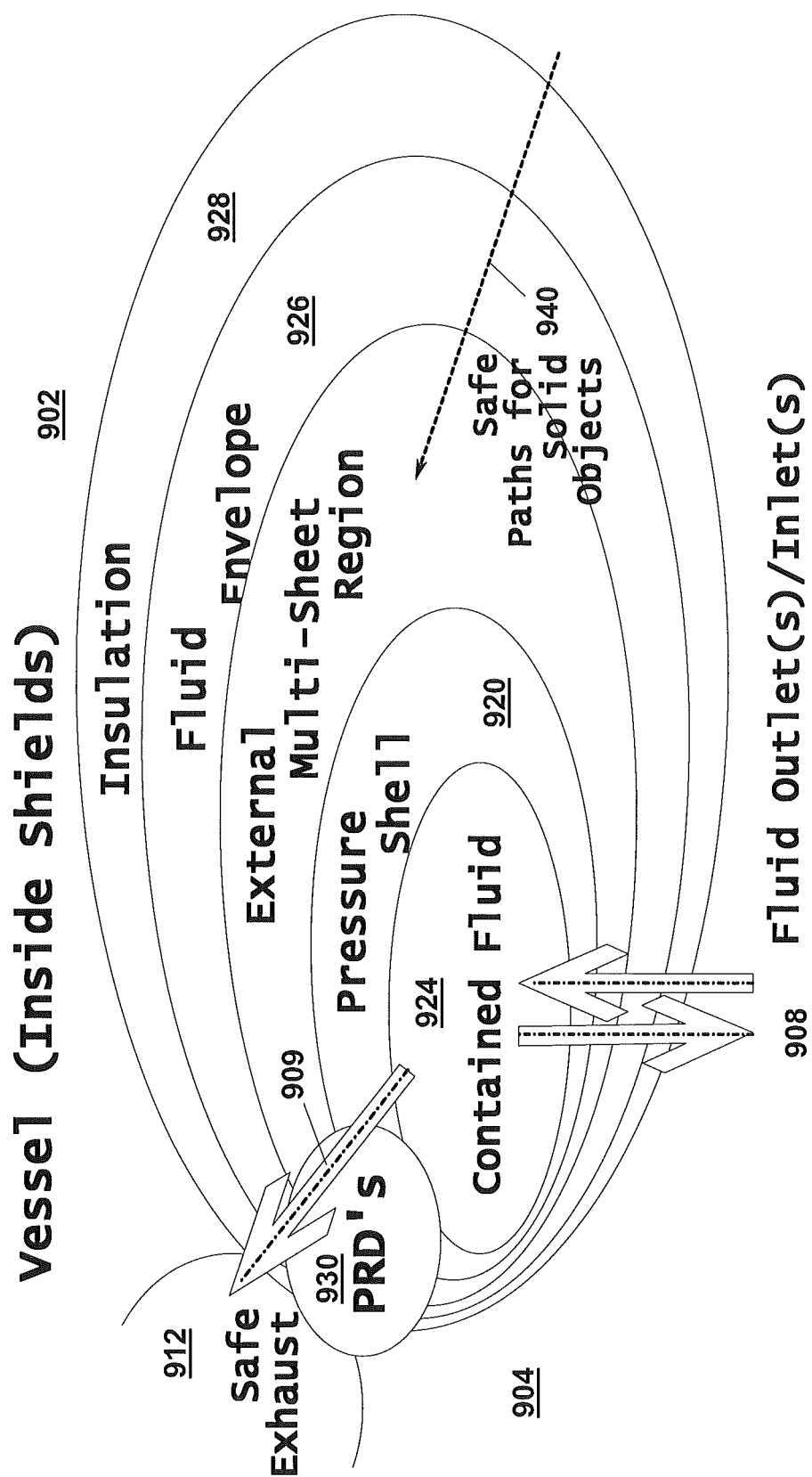
Figure 9C:
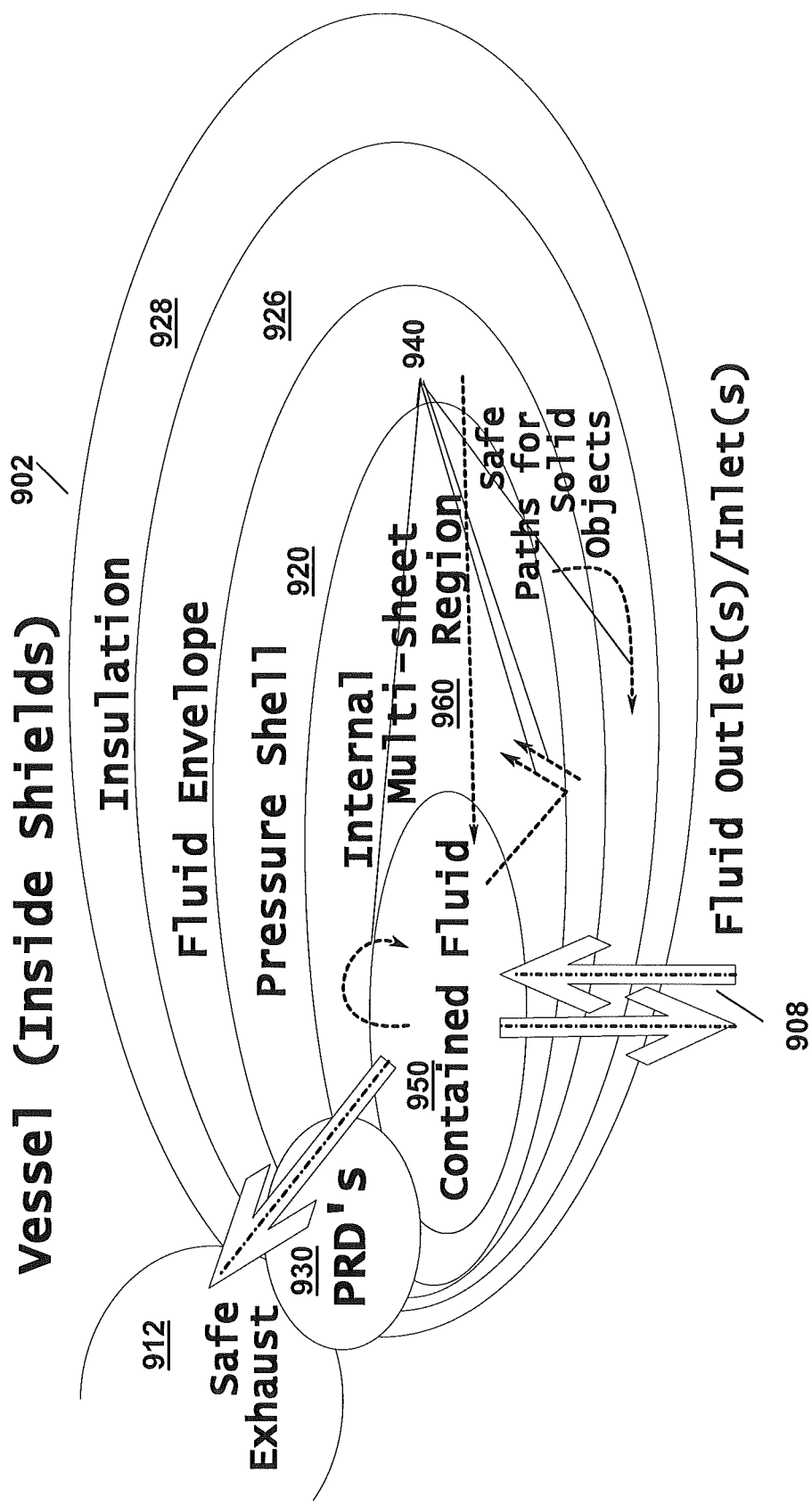
Figure 9D:
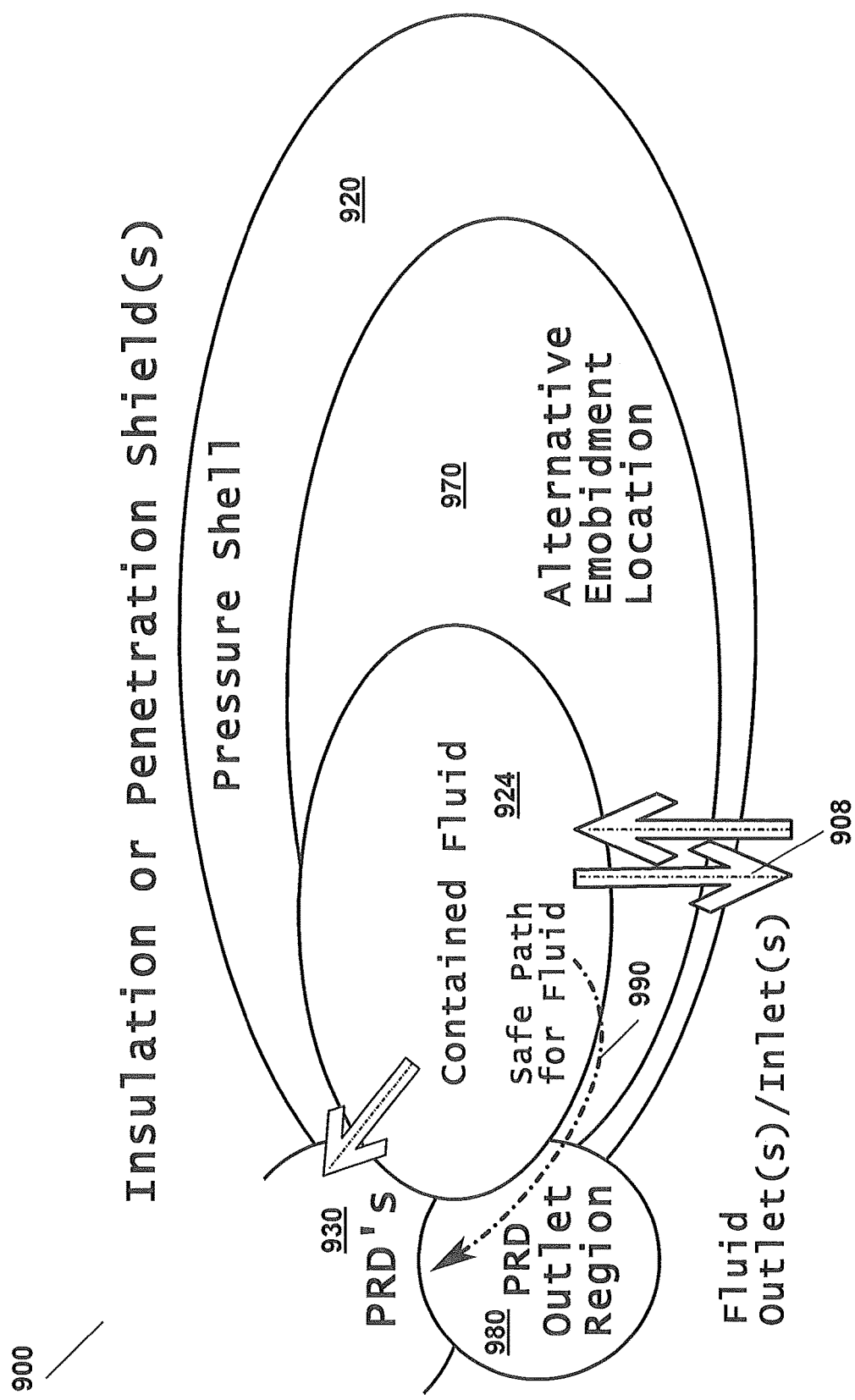

The interfaces shown in FIGS. 9A, 9B, 9C, and 9D illustrate examples of a "defense in depth" architecture to protect container 900. FIGS. 9B, 9C, and 9D illustrate examples that drill down hierarchically into safe exhaust 912, contents 902, and multiple sheets region 906. There may be fewer than 13-factorial-divided-by-two interfaces that would yield advantageous containers, although containers that utilize aspects of the present invention can be constructed in any fashion. Solids and fluids might move between any two regions, and in either direction. In some embodiments, it may be advantageous to interpose structure that blocks flow across many of these interfaces.

FIG. 9B further illustrates the "defense in depth" architecture of container 900 by illustrating one potentially advantageous multi-sheet region 922 that is attached to the exterior of container shell 920. In the embodiment of container 900 illustrated in FIG. 9B, an external multi-sheet region 922 surrounds pressure shell 920, that surrounds the contained fluid 924. As shown, pressure shell 920 is almost entirely enclosed by a multi-sheet region 922, except for allowed fluid paths through pressure relief devices (PRDs) 930 to safe exhaust system 912 (and thence to ambient 904) and through fluid inlets/outlets 908.

If container 900 holds pressurized fluid with embodiments similar to container 800, region 922 corresponds to possible exterior layer 830. Pipelines and other open containers could also have layers in region 922, outside the container shell 920 (corresponding to wall 114 of pipeline 100). As shown, fluid path 909 provides fluid flow through pressure relief devices (PRDs) 930 to safe exhaust system 912 and thence to ambient 904. PRDs 930 can, for example, the pressure relief provided by exterior margin 814 in container 800 (FIG. 8A).

External embodiments in pipelines, as well as in vehicles, may often face sufficient disadvantages from external embodiment regions 922, since these and many other applications pose high costs for any significant increase in overall container 900 volume. Fluid contents 924 provide the rationale for container 900, and any significant layer thickness of an external layer 922 adds dramatically to overall volume. The volume of uncontained ambient held in the cavities of layer 922, which may be a multi-sheet structure, makes this additional, costly exterior volume significant even if layer 922 itself is very thin.

Besides the external multi-sheet region 922 (which may include one or more individual single or multi-sheet layers) itself, a further barrier fluid envelope layer 926 may be utilized to prevent any fluid from escaping into ambient environment or penetration shield. Envelope layer 926 can stop even slow permeation or seepage of fluid outside its contained envelope, and in particular may be utilized to preserve the thermal isolation function of a surrounding envelope of insulation layer 928. Other regions that emerge as subsets of their surroundings in FIG. 9B are Pressure Relief Devices and burst diaphragms 930, which are extracted from their safe exhaust subsystem 912; safe paths for solid objects 940 emerging from the collection of hazard-mitigated solid paths 914; and the contained fluid 924 itself.

FIG. 9C illustrates an example of container 900 with a multi-sheet region 960 that is internal to pressure shell 920. In some embodiments, both multi-sheet 920 and multi-sheet region 922 region 922 may be utilized. Embodiment region 960 illustrated in FIG. 9C offers many solid object deflection paths 940 capable of preventing damage, and avoids almost of all the economic penalties attached to content-free volume of utilizing a container 900 with region 922, as illustrated in FIG. 9B.

FIG. 9D illustrates another example container 900. As shown in FIG. 9D, multi-sheet region 970, which may include one or more multi-sheet layers, is provided inside pressure shell 920, but does not completely surround contained fluid 924. PRDs 930 can empty any accidental or off-nominal operation fluid. In order for that released fluid to empty through PRDs 930, fluid 924 can remain contained (within fluid envelope 926 illustrated in FIG. 9C, for example) while it transits a localized region 980 within PRD 930. Although localized region 980 is labeled as an outlet multi-sheet region 970 in FIG. 9D, region 980 is also the inlet of PRD component 930. PRD region 980 can be as simple as a designed burst 'diaphragm' built into the outlet components of container 900. If container 900 is a pressure vessel such as container 800 illustrated in FIG. 8, region 980 can be built into boss margin 814 too compactly to be distinguished as a separate geometric location in FIG. 8B.

The entire passageway 990 illustrated in FIG. 9D can contain any safe fluid release within pressure shell 920, and so region 970 can operate at the container content pressure (which is often much larger than ambient pressure). The released fluid flows through any pressure reduction provided by the PRDs 930 and thereby out safe release path 912 and thence harmlessly into ambient 910. As such, in some embodiments, region 970 and its outlet region 980 can be very small in volume compared to the volume of container 900, since these regions can both be highly localized and operate at elevated pressure. Thereby this final region of embodiment can pose an insignificant content-free-volume penalty.

Besides the clear demarcation between embodiments that the schematic bubbles diagrams of FIGS. 9A through 9D suggest, several multi-sheet embodiments can combine efficaciously with conventional components in ways that improve container safety, function, or economics. Bullet or shrapnel penetration-prevention technologies that contribute transient mechanical strength to shell or wall container components may also advantageously be combined with layered elements according to the present invention to provide a combined defense against penetrating and rupturing chains of events, superior to the protection that either technology could achieve by itself. Multi-sheet structures can protect against the partially-sealed puncture of a bullet proof layer. Other already-proven defensive devices, including active and passive controlled release paths (conventionally called pressure relief devices and burst discs) and mixing of released fluid with the exterior ambient, are best located in sheltered regions of the container's exterior, such as boss margin 814. The highest leverage location for such combined embodiments breaks up chain reactions by putting flow control components in series with embodiments at regions such as 970, so that a flame and not a torch results if flow control components eject a catch fire.

This disclosure provides example embodiments of the invention only and should not, themselves, be considered limiting. One skilled in the art may recognize from this description various modifications and extensions that should be included within the scope of this disclosure. As such, the invention should be limited only by the following claims.

I claim:

1. A container, comprising
a container wall;
one or more layers arranged adjacent to the container wall, each of the one or more layers having at least one sheet and at least one of the one or more layers being a multisheet layer having a plurality of sheets, wherein the plurality of sheets have the same spatial boundaries;
wherein at least an innermost layer of the at least one or more layers deforms in response to a failure in the container wall to impede flow through the container wall.

2. The container of claim 1, wherein the at least one multi-sheet layer includes cavities formed between individual sheets of the multi-sheet layer.

3. The container of claim 2, further including passageways formed in sheets of the multi-sheet layer to allow fluid flow between adjacent ones of the cavities.

4. The container of claim 3, wherein, during an event that causes the failure in the container wall, the passageways are closed by a relative motion of individual sheets of the multi-sheet layer relative to one another.

5. The container of claim 1, wherein the plurality of sheets of the at least one multi-sheet layer are aligned and attached to one another along their aligned surface areas.

6. The container of claim 5, wherein the individual sheets include planar sheets and cavity forming sheets.

7. The container of claim 6, wherein the cavity forming sheets form regularly spaced geometric formations.

8. The container of claim 6, wherein the cavity forming sheets form Penrose tiled cavities.

9. The container of claim 6, wherein the individual sheets are lightly bonded to adjacent sheets.

10. The container of claim 9, wherein an adhesive is utilized to bond the individual sheets.

11. The container of claim 9, wherein compression is utilized to bond the individual sheets.

12. The container of claim 1, wherein the plurality of sheets of the multisheet layer are each attached to an external frame.

13. The container of claim 12, wherein individual sheets of the plurality of sheets transform relative to one another to form a seal during a failure in the container wall.

14. The container of claim 1, wherein the container is a pipeline and wherein the one or more layers includes a middle layer and a multi-sheet inner layer concentrically placed within the pipeline.

15. The container of claim 14, wherein the pipeline includes a flow control device.

16. The container of claim 1, further including a multi-sheet layer external to the wall.

17. The container of claim 1, wherein the container is a pressure vessel.

18. The container of claim 17, wherein the container includes a boss that allows ingress and egress of fluid to a volume of the container.

19. The container of claim 18, wherein the container includes an exterior margin.

20. The container of claim 18, wherein the container is configured to control phase segregation.

21. The container of claim 1, wherein a liner is placed between the multisheet layer and the wall.

22. The container of claim 1, wherein the container is a pipe and the container wall defines a passage, the one or more layers have the same spatial boundaries with the container wall and fully circumscribe the container wall, and wherein an interior space of the pipe is free of flow impediments.

23. The container of claim 1, wherein the one or more layers have the same spatial boundaries such that the layers overlap each other, and at least partially circumscribe the container wall.

24. The container of claim 1, wherein the container is a vacuum vessel.

* * * * *